(12) United States Patent
Bunn et al.

(10) Patent No.: US 7,591,218 B2
(45) Date of Patent: Sep. 22, 2009

(54) LOOSE COFFEE APPARATUS, SYSTEM AND METHOD

(75) Inventors: Arthur H. Bunn, Springfield, IL (US); John D. Bishop, Decatur, IL (US); Christopher W. Rahn, Virden, IL (US); Randy D. Pope, Edinburg, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 395 days.

(21) Appl. No.: 11/101,321

(22) Filed: Apr. 7, 2005

(65) Prior Publication Data

US 2006/0011066 A1 Jan. 19, 2006

Related U.S. Application Data

(60) Provisional application No. 60/560,033, filed on Apr. 7, 2004, provisional application No. 60/606,233, filed on Sep. 1, 2004, provisional application No. 60/627,080, filed on Nov. 12, 2004.

(51) Int. Cl.
*A47J 31/00* (2006.01)
(52) U.S. Cl. .......................... 99/323; 99/295
(58) Field of Classification Search ............ 99/295, 99/323; 220/4.21, 4.24, 4.25, 4.26; 426/112, 426/115, 77, 82
See application file for complete search history.

(56) References Cited

U.S. PATENT DOCUMENTS

| | | |
|---|---|---|
| 4,027,582 A | 6/1977 | O'Connell |
| 4,083,295 A | 4/1978 | Hollingsworth |
| 4,577,080 A | 3/1986 | Grossman |
| 4,908,222 A | 3/1990 | Yu |
| 5,010,221 A | 4/1991 | Grossman et al. |
| 5,406,882 A | 4/1995 | Shaanan |
| 5,427,233 A * | 6/1995 | Zinck et al. ............... 206/69 |
| 5,618,570 A | 4/1997 | Banks et al. |
| 5,634,394 A * | 6/1997 | Cortese ................... 99/295 |
| 5,638,739 A | 6/1997 | Shaanan et al. |
| 5,642,656 A * | 7/1997 | Braendle ................. 99/295 |
| 5,771,777 A | 6/1998 | Davis |
| 5,775,206 A | 7/1998 | St-Gelais |
| 5,799,566 A * | 9/1998 | Breinlinger et al. ....... 99/320 |
| 5,809,867 A | 9/1998 | Turner et al. |
| 5,826,493 A * | 10/1998 | Tien Lin .................. 99/306 |
| 5,880,441 A | 3/1999 | Hartman et al. |

(Continued)

FOREIGN PATENT DOCUMENTS

DE 203 15 193 U1 1/2004

(Continued)

*Primary Examiner*—Reginald L Alexander
(74) *Attorney, Agent, or Firm*—Barnes & Thornburg LLP

(57) ABSTRACT

An infusion container for use with a brewer. The infusion container includes a body portion defining at least a portion of a cavity therein. At least a portion of the body being liquid permeable. The infusion container liquid permeable portion facilitates brewing a beverage by allowing water to pass through the infusion container. The infusion container may be an individual structure which can be placed in and removed from the holder. Additional components or group of components for use with the beverage holder. The infusion container provides structures and methods facilitating convenient use of a brewer which allows the user to use the type of substance and quantity of substance of their choice and efficiently clean the substance holder.

10 Claims, 18 Drawing Sheets

U.S. PATENT DOCUMENTS

| | | | |
|---|---|---|---|
| 5,894,785 A * | 4/1999 | Molinari | 99/303 |
| 5,913,963 A | 6/1999 | King | |
| 5,952,028 A | 9/1999 | Lesser | |
| 6,007,853 A | 12/1999 | Lesser | |
| 6,038,963 A | 3/2000 | Patterson et al. | |
| 6,079,318 A | 6/2000 | Davis | |
| 6,324,966 B1 | 12/2001 | Joergensen | |
| 6,339,985 B1 | 1/2002 | Whitney | |
| 6,354,190 B1 * | 3/2002 | Haydon | 99/323 |
| 6,401,597 B1 | 6/2002 | Stettes et al. | |
| 6,520,070 B1 | 2/2003 | Heczko | |
| 6,561,080 B1 | 5/2003 | Feeney | |
| 2002/0096055 A1 | 7/2002 | Heczko | |
| 2004/0237794 A1 | 12/2004 | Fulgoni et al. | |
| 2005/0005774 A1 | 1/2005 | Fulgoni et al. | |
| 2007/0181002 A1 | 8/2007 | Rahn | |
| 2007/0221069 A1 | 9/2007 | Rahn et al. | |

FOREIGN PATENT DOCUMENTS

| | | |
|---|---|---|
| NL | 1 020 835 C2 | 12/2003 |
| WO | WO 03/101860 | 12/2003 |

* cited by examiner

LOOSE COFFEE APPARATUS, SYSTEM AND METHOD

CROSS-REFERENCE TO RELATED PATENT APPLICATION

This patent application claims the benefit of U.S. Provisional Patent Application No. 60/560,033, filed Apr. 7, 2004; U.S. Provisional Patent Application No. 60/606,233 filed Sep. 1, 2004; and U.S. Provisional Patent Application No. 60/627,080 filed Nov. 12, 2004. The disclosures set forth in the referenced provisional applications are incorporated herein by reference in their entirety, including all information as originally submitted to the United States Patent and Trademark Office.

BACKGROUND

A variety of brewing apparatus have been developed to combine heated water with a brewing substance such as ground coffee or tea material in order to infuse the material and produce a brewed beverage. There are many ways to combine the water with the brewing substance.

One way of brewing a beverage is to manufacture or prepackage and encapsulate the brewing substance in a filter material. The brewing substance in the filter material provides a convenient package for handling a predetermined quantity of brewing substance. The filter material provides a package or container for the brewing substance. This package allows the brewing substance to be handled prior to brewing and after brewing without complication or mess.

Such brewing substances pre-packaged in filter material are referred to as "pods" or "sachets." Pods can be compressed while packaging in the filter material or left in a generally uncompressed condition. Pods are typically circular shaped and have a somewhat flattened configuration. Thus, pods often are provided in the shape of a disc or puck. Pods generally range in a size from approximately 45 mm to 60 mm and contain approximately 9-11 grams of brewing substance. The typical pod is used to produce approximately 8 ounces of brewed beverage. As a result, pods are generally used in conjunction with single-serve brewers (i.e., one or two cup brewers) rather than the larger, multi-serve brewers.

Although convenient, pod use in single-serve brewers may be less desirable in some situations. For example, because the pods are prepackaged by a pod manufacturer, the selection of brewing substances is limited to the pod manufacturer's selection. As a result, a consumer or user may not be able to use his/her favorite brewing substance when utilizing a prepackaged pod. Similarly, because the pods are prepackaged, varying the strength of the resultant beverage may be accomplished by increasing or decreasing the amount of brewing water delivered to the brewing substance or the pattern of delivering water to the brewing substances.

Uniform flavor extraction from the brewing material may be more difficult to achieve with a pod. Unlike open filter brewer designs which use a cone or "cup cake" filter paper brewing substance in a pod is confined within the pod and generally is not free to agitate in the brewing liquid. Instead, the brewing liquid tends to pass directly from the top of the pod to the bottom of the pod, collecting solubles as it passes through. This vertical flow pattern through the pod may result in some areas of the brewing substance being over extracted and other areas being under extracted. Accordingly, the flavor of the resulting beverage may be affected due to the non-uniform extraction of solubles, particles and other flavor characteristics from the particles of brewing substance.

In some instances, access to or availability of prepackaged pods is limited due, in part, to their proprietary nature (i.e., certain prepackaged pods are suitable for use in a particular brewer) and their associated limited distribution. For example, some brands of prepackaged pods may only be purchased from high-end specialty stores or mail/Internet ordering.

It would be desirable to provide an apparatus and method for containment of the brewing substance used in a brewer.

It would be desirable to provide the ability to allow a user to select the brewing substance used in a brewer.

It would be desirable to provide an ability to adjust the quantity of brewing substance used in a brewer.

DESCRIPTION OF THE DRAWINGS

The organization and manner of the structure and function of the disclosure, together with the further objects and advantages thereof, may be understood by reference to the following description taken in connection with the accompanying drawings, and in which.

DETAILED DESCRIPTION

Figure 1:
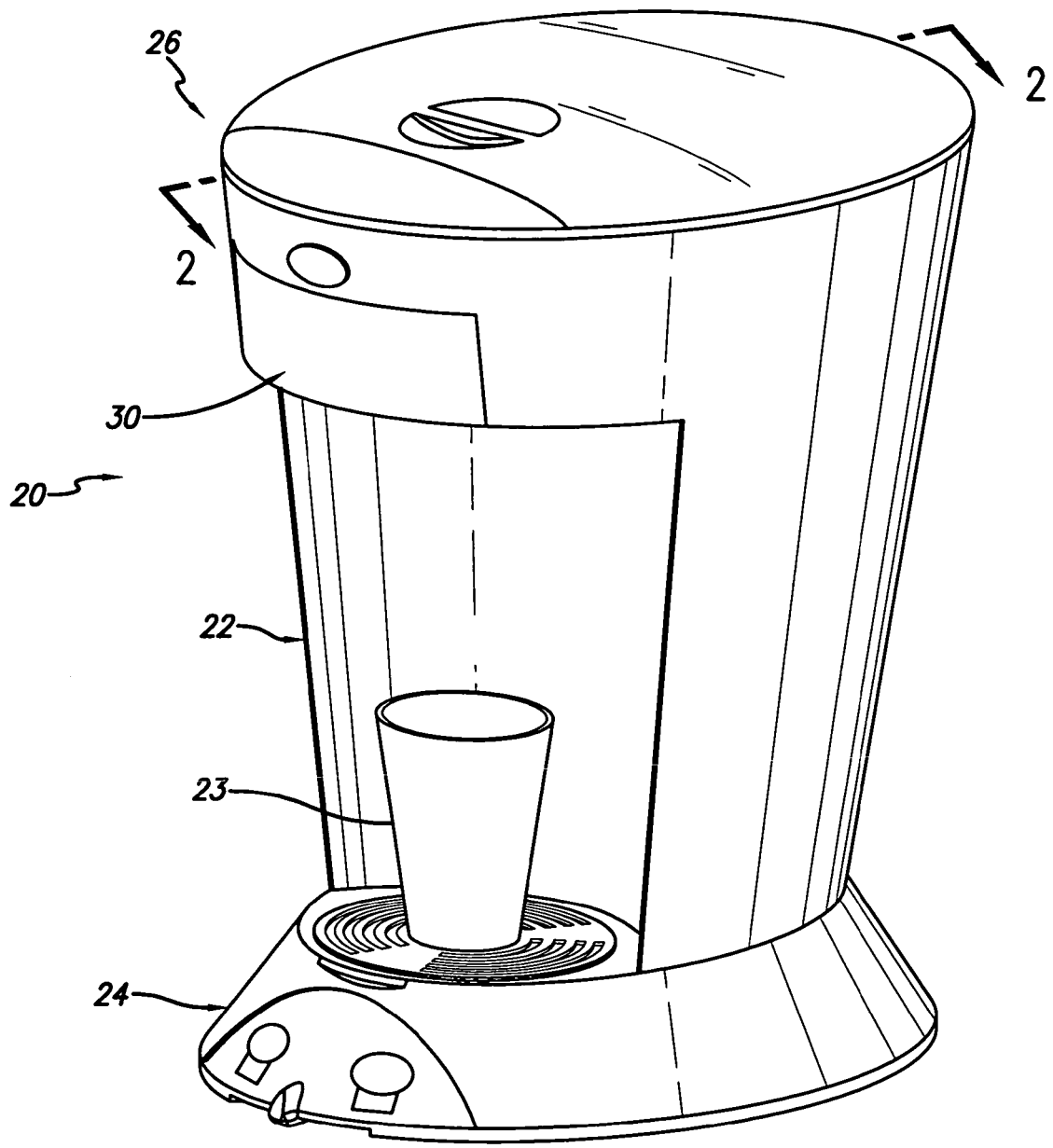
FIG. 1. is a perspective view of an example of an embodiment of a brewer for use with a brewing substance holder as set forth in the present disclosure.

While the present disclosure may be susceptible to embodiment in different forms, there is shown in the drawings, and will be described herein in detail, one or more embodiments with the understanding that the present description is to be considered an exemplification of the principles of the disclosure and is not intended to be exhaustive or to limit the disclosure to the details of construction and the arrangements of components set forth in the following description or illustrated in the drawings.

In general, a pod assembly or infusion container for use in a brewer is disclosed. The pod assembly may be provided in one of many suitable configurations adapted to enable substantial containment of a brewing substance while at the same time, allowing brewing substance selection and accommodating varying amounts of the selected brewing substance. Although described for use in a single-serving single brewer, it is contemplated that the pod assembly described herein may also be utilized with other types of brewing devices, for example, with a multiple cup brewer, espresso brewer, or a French-press or plunger-type beverage maker.

By way of background, and not limitation, as shown in FIG. 1, a single-serving brewer 20 includes a body 22, a base 24 and an upper portion 26. The upper portion 26 is configured to be positioned above a container such as a cup 28 for dispensing the brewed beverage into the cup 28. It should be noted that many different configurations of the single-serving brewers 20 can be utilized in conjunction with the various embodiments of the infusion container described in this disclosure. For example, in addition to the single-server brewer manufactured by Bunn-O-Matic Corporation and described herein, single-serving brewers manufactured by Black & Decker, Krups, Home Café, Hamilton Beach, Mr. Coffee, Melitta, Senseo, Flavia, Keurig and Nespresso can be utilized in conjunction with the infusion containers. All of the embodiments disclosed can be modified and/or sized and dimensioned to fit or otherwise work with other brewers, which one of skill in the art could accomplish without undue experimentation.

Terms including beverage, beverage making and brewing as used herein are intended to be broadly defined as including but not limited to the brewing of coffee, tea, and any other brewed beverage. This broad interpretation is also intended to include, but is not limited to any process of infusing, steeping, reconstituting, diluting, dissolving, saturating or passing a liquid through or otherwise mixing or combining a beverage substance with a liquid such as water without a limitation to the temperature of such liquid unless specified. This broad interpretation is also intended to include, but is not limited to beverage substances such as ground coffee, tea, herbs, roots, liquid beverage concentrate, powdered beverage concentrate, freeze dried coffee or other beverage concentrates, to obtain a desired beverage or other food.

While an embodiment of an infusion container or pod assembly is described herein, it is contemplated that other forms of infusion container, pod assembly or other beverage brewing substance container that substantially contains the brewing substance may be used. It is further contemplated that the present pod assembly could utilize other brewing substances and/or concentrates such as, but not limited to, freeze dried concentrates, gel, liquid, powder, gas, vapor or any other form or combination of substance or concentrate which will operate with the disclosed infusion container as well as equivalents thereof and any modifications which might be required to modify the infusion container to be used with such other substances, if necessary.

As shown in FIG. 1, an upper portion 26 of the single-serving brewer 20, includes a holder 30 attached to a mounting portion 32 of the upper portion 26. The holder 30 in this embodiment has a drawer-like configuration to retain a volume of brewing substance, such as an infusion container disclosed herein, in a predetermined position. The specific embodiment of the brewer is provided for illustration. Use of the disclosed structures and methods with other brewers in addition to the specific embodiment shown is within the scope of this disclosure.

Figure 2:
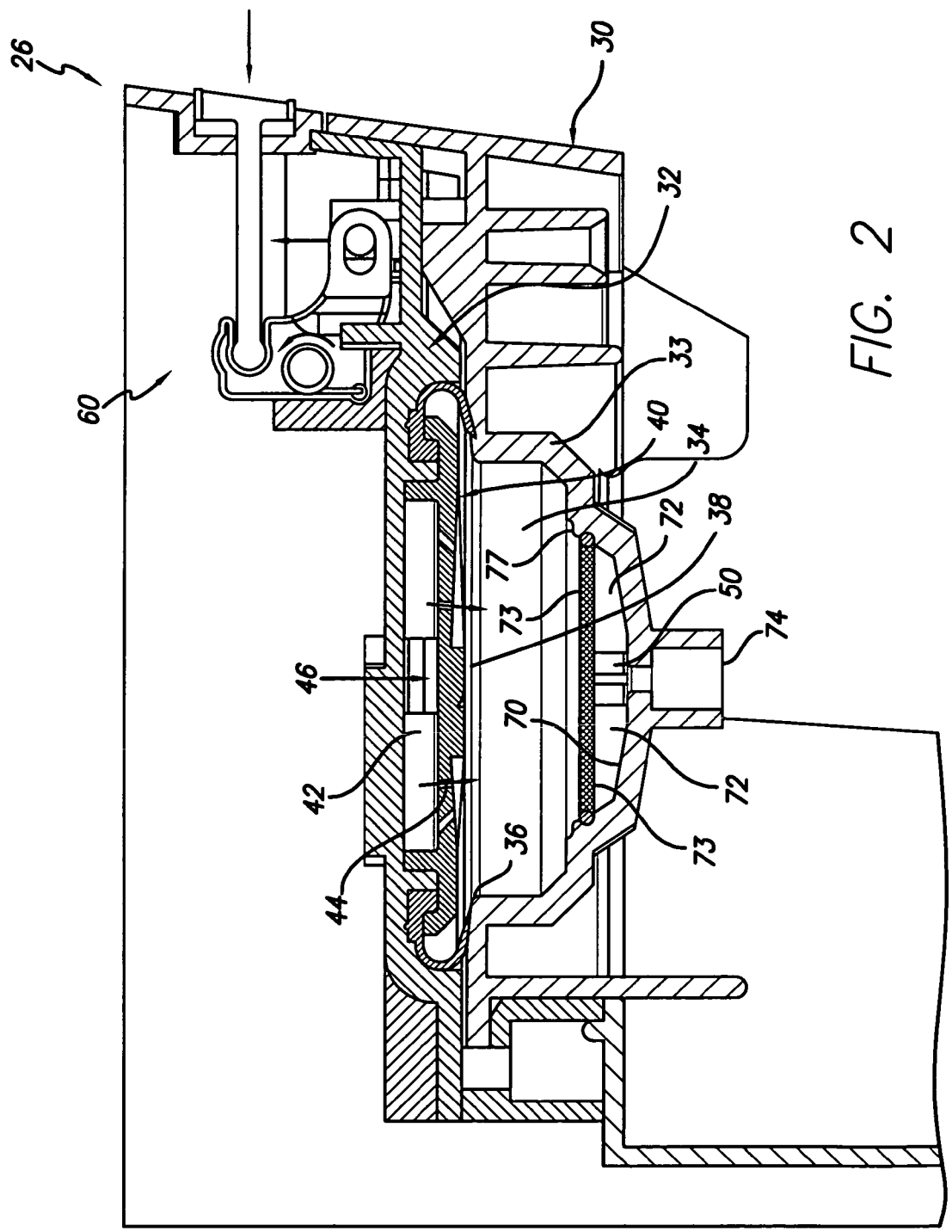
FIG. 2 is an enlarged partial fragmentary cross-section side elevation view taken along 2-2 in FIG. 1.
Figure 3:
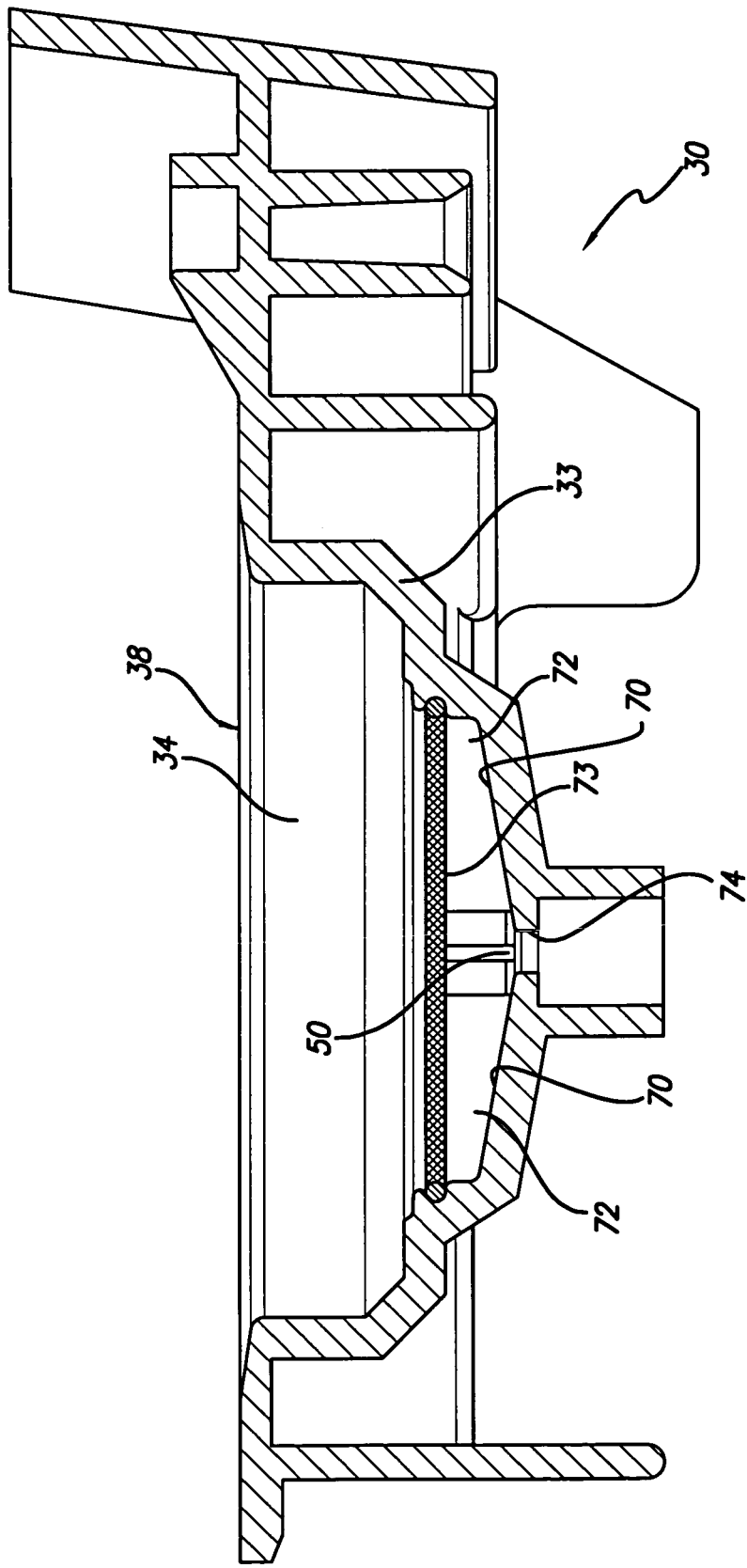
FIG. 3 is a view of a brewing substance holder removed from the brewer of FIG. 1.
Figure 4:
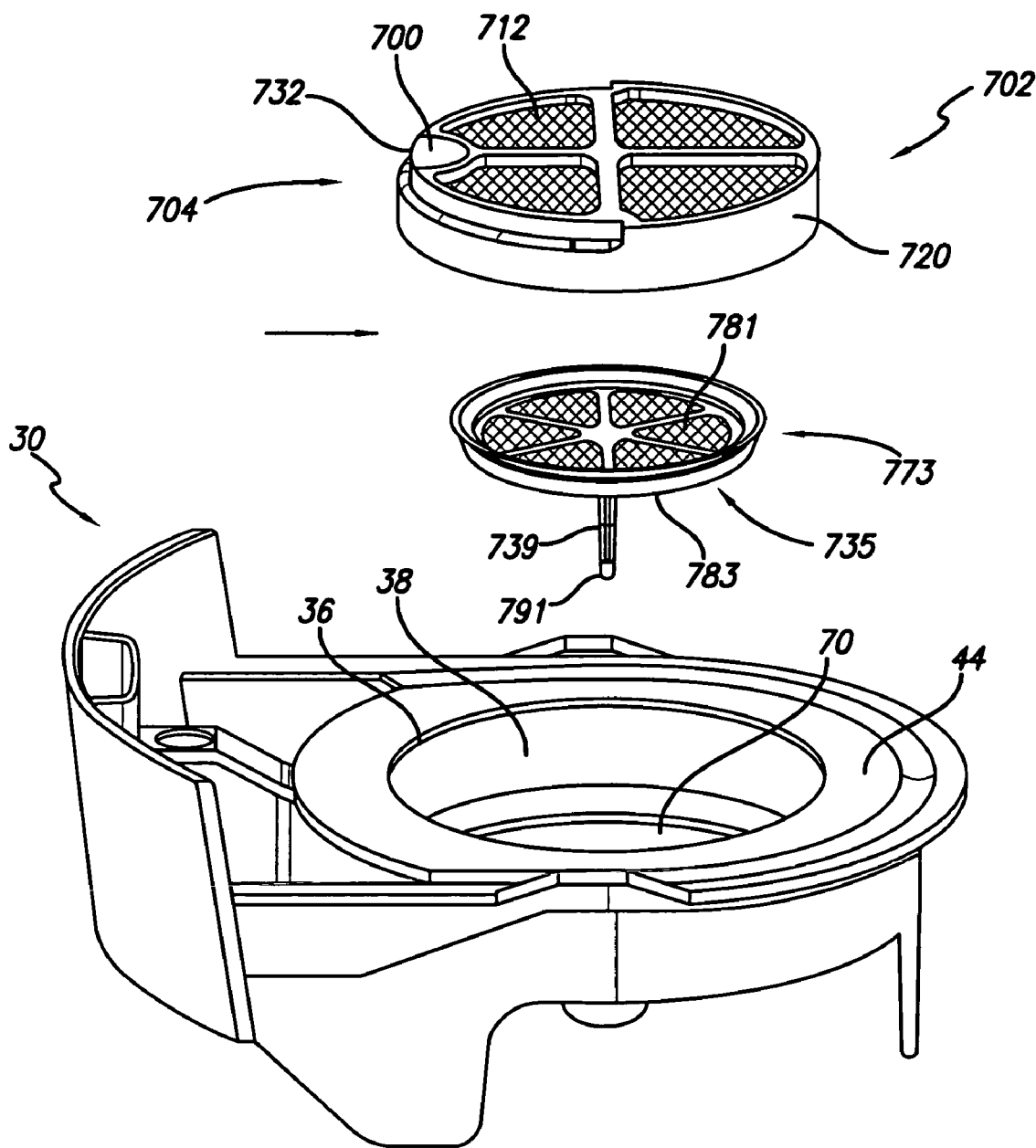
FIG. 4 is an exploded perspective view of a brewing substance holder showing an embodiment of a loose coffee holding assembly having an insert or base and a cover portion extending over the cavity in which brewing substance is retained.
Figure 5:
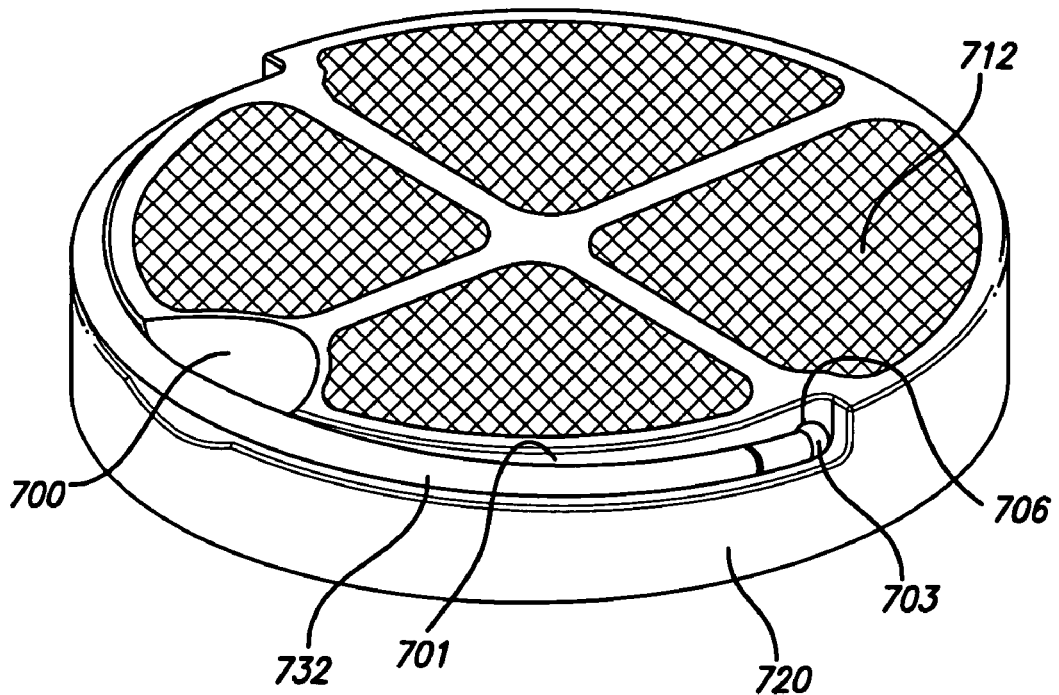
FIG. 5 is an enlarged perspective view of the cover portion.
Figure 6:
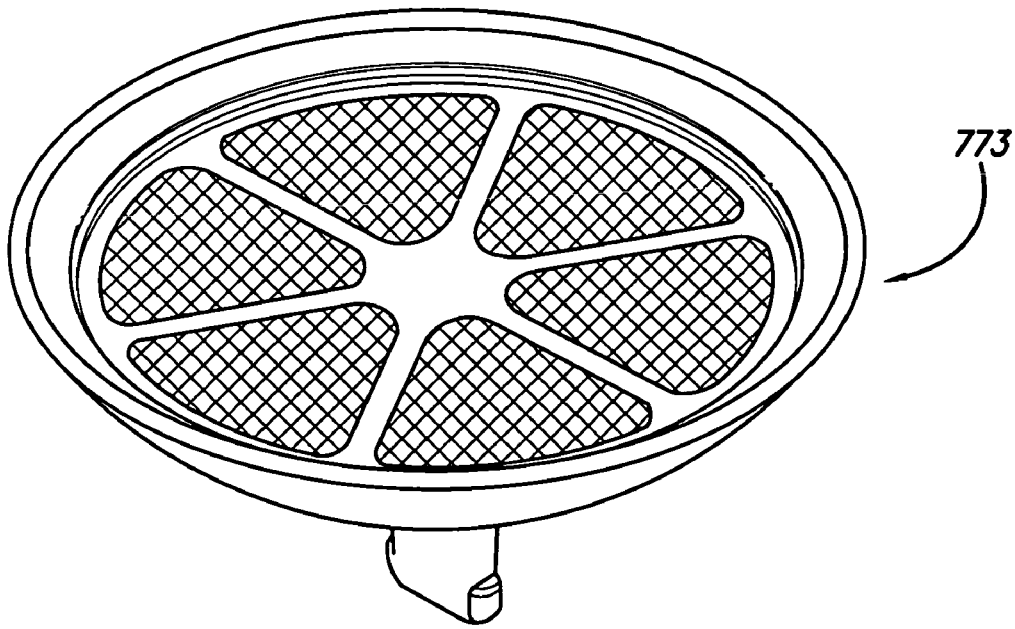
FIG. 6 is an enlarged perspective view of the insert.

FIG. 2 shows a section of the upper portion 26 of the single-serving brewer 20, taken along cross-sectional line 2-2 in FIG. 1. With reference to FIG. 2, the holder 30 includes a wall 33 which defines a cavity 34 therein. The wall 33 defines an upper rim 36 defining an entry opening 38. While a holder 30 as described herein is shown as having a drawer-like configuration, it is contemplated that a variety of suitably configured holders may be used to define or retain the infusion container described herein. For example, a variety of brewing devices as mentioned above might include a clam shell type of pod holder, as well as an espresso-type beverage holder. It is envisioned that the infusion container of the present disclosure may be configured to accommodate these various brewing apparatus.

In addition, the holder 30 is configured with a floor 70 positioned in a lower portion of the holder 30 bounded by the wall 33. Walls or ribs 72 positioned relative to the floor 70 enable pooling and mixing of the brewing beverage prior to dispensing into the cup 28. A drain passage 74 formed in a lower portion of the floor 70 communicating with the cavity 34 facilitates the draining of brewed beverage from the cavity 34.

A support structure 73, adapted to retain the customized pod above the floor 70 of the holder 30, is provided overlying the ribs 72. Although preferably configured as a liquid permeable material such as an open mesh structure using woven metal or non-metallic strands, other configurations of the support structure 73 having other materials such as woven and non-woven materials are contemplated by this disclosure. The support structure 73 may be either fixedly attached or removably attached to an inside surface of the holder 30. It should be noted that the holder 30 may be configured with a support structure 73 which does not have mesh. This will become apparent as further disclosure is provided in this document. There are embodiments of the infusion containers which include structure for selective filling with a brewing substance, such that the infusion container can be placed on a support structure 73 without the need for open mesh or other filtering type of structures. In this regard, the filtering will occur in the infusion container as opposed to the support structure. As such, embodiments of the support structure 73 without the mesh or other filtering type of structures is included within the scope of this application.

When the holder 30 containing the pod is inserted into the upper portion 26, it engages with the mounting portion 32. As illustrated, the mounting portion 32 includes one or more ramped, or inclined, surfaces with flat surfaces disposed therebetween, sized to receive the wall 33 when the holder 30 is inserted into the upper portion 26. Additionally, the mounting portion 32 may include a release assembly 60 to selectively retain the holder 30 and ensure proper positioning of the infusion container during the brewing process.

Figure 7:
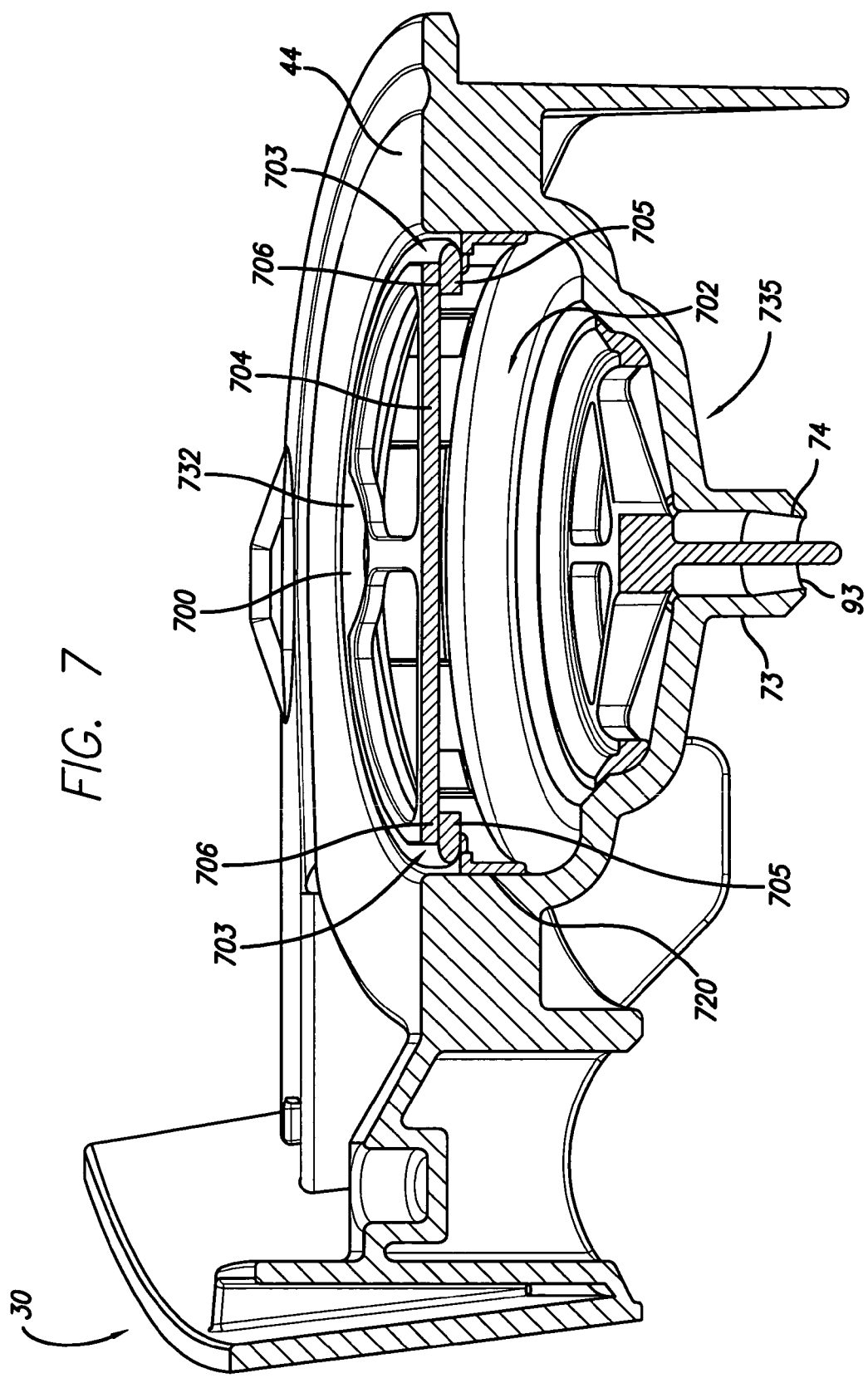
FIG. 7 is an enlarged partial fragmentary cross sectional view of the structures as shown in FIGS. 4-6 assembled in the brewing substance holder showing the relationship of the structures when used in the holder.

The embodiment shown in FIGS. 4-7 shows an infusion container or pod assembly 702 which includes a cover 704 and an insert or base 735. The base 735 as shown is removable fro the holder. However, the base could be integrally formed, such as by molding or forming, in the bottom of the holder and not be removable from the holder. As shown in FIG. 7 and as further illustrated in FIG. 8, the base includes a blade 739 and a protruding end 791 which extends beyond a rim 93 of a drain 74 to retain the insert 735 in the holder 30. As noted in further detail below, the blade 739 tends to provide a columnating or laminating flow of the beverage passing through the drain.

With further reference to FIG. 7, the insert 735 defines a floor or base and the cover 704 is positioned over the insert in the cavity 34. The cover 704 and insert 735 define a cavity 706 or brewing substance space for retaining brewing substance. Brewing substance filter material is not shown in FIG. 7 in the interest of clearly showing the structures therein. However, it is envisioned that the user can provide a desired quantity of brewing substance placed in the cavity 706. In this regard, the cavity 706 may be loosely filled or compacted when filled with brewing substance. If the user wishes to provide a large charge of brewing substance in the cavity 706, the brewing substance is placed on an upper portion or top portion of the base 735 in the cavity 706. The cover 704 is then placed over the cavity and pressed into the quantity of brewing substance. Placing the cover 704 over the brewing substance may tend to compact the brewing substance if the quantity of brewing substance is sufficient to extend above the upper portion or rim 40 of the holder 30.

Water flows from the outside of the cover 704 by way of a spray head 40 positioned thereabove. Water dispensed by the spray head flows from the topside of the cover 704 and through a mesh or foraminous portion 712 of the cover 704 flowing into the brewing substance retained in the cavity 706. Passages 714 provided through the insert 735 allowing beverage, such as coffee, which is extracted from the brewing substance by the water flow there through. The drain passage 74 defined by a drain wall 73 provides a path through which the beverage brewed in the cavity is allowed to drain and, as a result, be dispensed from the brewer. The insert 735 is adapted to retain the brewing substance above a floor of 70 of the pod holder 30. In this regard, the uncontained brewing substance can be placed directly into the cavity on top of the insert 735 with the cover 704 placed over the brewing substance. The insert or base 735, cavity 34 in the holder and the cover 704 define an infusion container 702 in this embodiment.

The cover 704 includes a rim portion 720 which retains the liquid permeable, foraminous or materials 712 therein. Mesh material can be attached to the frame using a variety of methods and structures, including, by way of example but not limitation, welding, adhesives, rolling, overmolding or any other way and means to retain the mesh on the rim.

As shown in the figures, a bail or handle 732 is provided on the cover 704 attached generally to the rim. While a variety of handles may be used, a pivotable bail or handle is shown. A finger grip or nail nick 700 is shown formed in the rim 720. This allows a user to grip a portion of the handle 732 and raise it for removal from the holder 30. The bail pivots down into a corresponding recess 701 formed around a corresponding portion of the rim 720 to receive the bail. In this regard, the bail can be lifted to remove the cover 704 from the holder 30 and placed in the recess 701 when the cover 704 is inserted into the holder 30. This allows the bail to be recessed or placed at a level which is generally flush with a top surface of the cover 704 so as to not interfere with the brewing process. The handle 732 pivots at pivot joints 703 which are defined by end portions 705 of the handle extending through corresponding openings 706 formed the recess 701 on the rim 720.

In use, the holder 30 is removed from the brewer 20. The base 735 is placed in the cavity 706 with the blade 739 extending through the drain 74 and the end 791 extending beyond an edge of the drain. With the base 735 retained in the cavity 706 of the holder 30 coffee or other brewing substances may be placed on top of the base 735. Once a desired or predetermined quantity of brewing substance is placed in the cavity 706 above the base 735 the cover 704 is placed in the cavity 706. After the cover 704 has been positioned over the brewing substance the cover 704 may need to be pressed over the brewing substance so as to make the top surface of the cover generally flush with the corresponding top surface of the holder 30. When the user has positioned the cover 704 in the desired position, the bail or handle 732 can be lowered into the recess 701.

The holder 30 including the assembly 702 is then placed into the brewer 20 for brewing. During the brewing process water enters the upper portion of the cover 704 to flow through the liquid permeable portion 712 in the openings and into the brewing substance contained under the cover 704 in the brewing substance cavity. The brewing substance is infused by the water and a beverage flows through the base. Beverage flowing through the base flows onto the drain 74 for dispensing from the brewer.

When the user has completed the brewing process the holder 30 is removed from the brewer 20. The user places his finger in the finger grip 700 to grip the handle 732. As the user pulls up on the handle 732 the handle pivots at the pivot joint 703. After an appropriate amount of force is applied, the user will be able to disengage the cover 704 from the cavity 706. The user then can empty the spent coffee or other brewing substance from the cavity 706 by inverting it over a disposal container. The cover 704 and holder 30 can be washed either manually or in a dishwasher. When cleaned, the holder 30 and corresponding components 735, 704 can be prepared for the next use.

Figure 8:
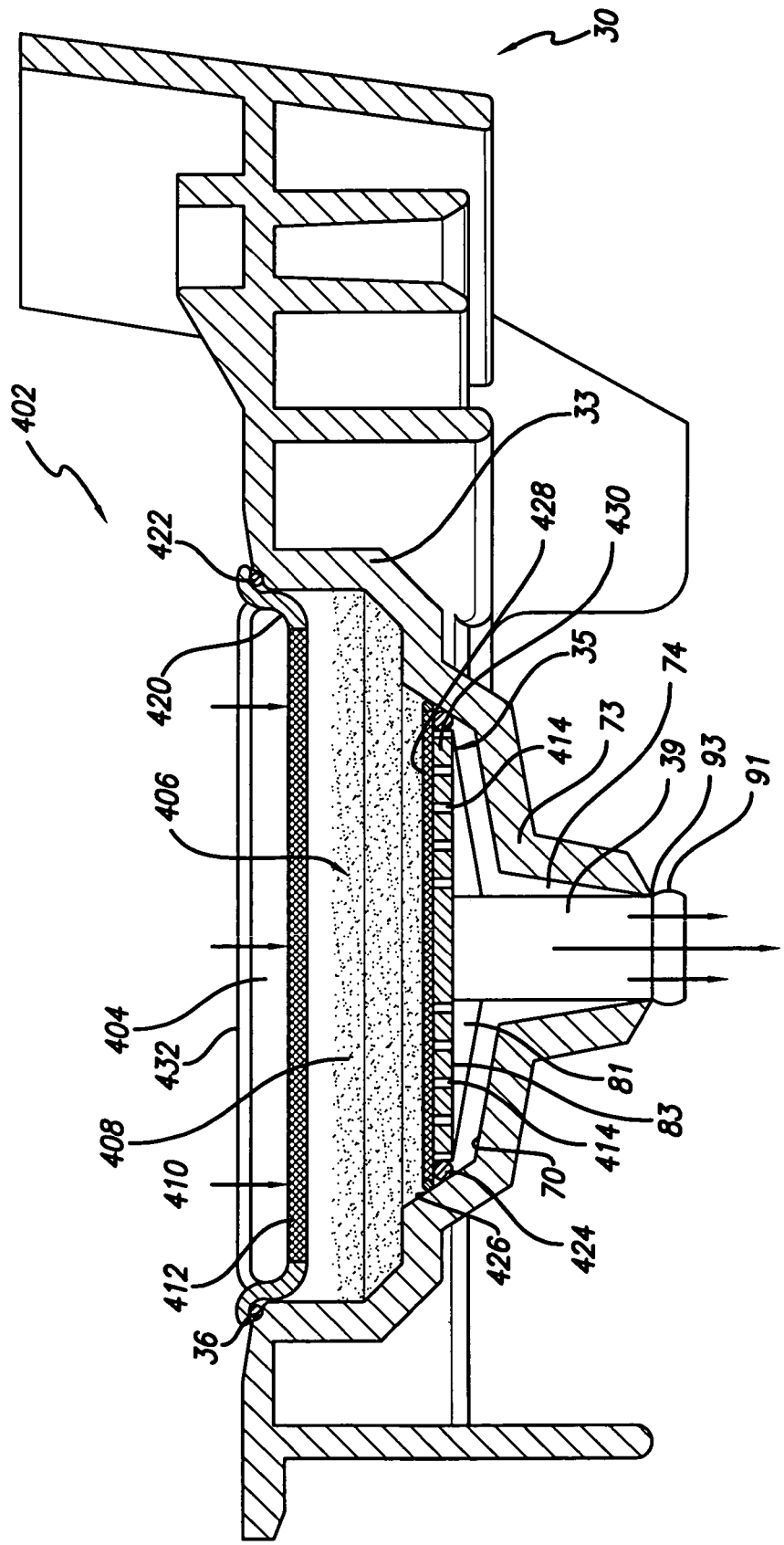
FIG. 8 is another embodiment of a reusable infusion container system generally similar to that as shown in FIGS. 2 and 3 showing a cross section of a holder and including a removable insert and a removable cover.

As shown in FIG. 8, another embodiment of a reusable container or infusion container 402 used with a pod holder 30 is defined by an insert 35 which defines a base and a cover 404 which is positionable over the insert 35. The cover 404 and insert 35 define a cavity 406 or space when positioned in the holder 30 for retaining the brewing substance 408. Water 410 flows from the outside of the cover 404 and through a mesh or foraminous portion 412 of the cover 404 flowing into the brewing substance 408. Passages 414 are provided through the insert 35 allowing coffee beverage which is extracted from the brewing substance 408 by the water 410 to flow downwardly there through. A drain 74 defined by a drain wall 73 provides a path through which beverage brewed in the cavity 406 is allowed to drain and, as a result, be dispensed from the brewer. The pod holder insert 35 is adapted to retain the brewing substance 408 above a floor 70 of the pod holder 30. A series of braces 81 are provided on an underside 83 of the insert 35. Further reference to and details relating to structure and function of the insert 35 is provided in the related application U.S. Provisional Application No. 60/575,235 which is incorporated herein by reference in its entirety.

As shown in FIG. 8, the insert 35 includes a protruding end 91 and a blade 39. The blade 39 generally extends through the drain passage 74 with the protruding end 91 extending beyond a rim 93 of the drain 74 to retain the insert 35 and the holder 30. The blade tends to provide a columnating or laminating flow of the beverage passing through the drain.

The cover 404 includes a rim portion 420 which retains the foraminous or mesh material 412 therein. The mesh material can be attached to the frame using a variety of methods and structures, including, by way of example but not limitation: welding, adhesives, rolling, overmolding or any other way and means to retain the mesh on the rim. With reference to FIG. 8, a seal 422 is carried on the rim 420 for engaging in upper rim 36 of a wall 33 of the holder 30. The seal helps to reduce or prevent the flow of liquid out of the cavity and therefore tends to direct the flow of beverage brewed in the cavity downwardly towards the insert 35. As noted above, the insert 35 has a foraminous area, thereby allowing the passage of brewed beverage there through. A similar seal 424 is provided on the insert so as to engage a corresponding surface 426 of the wall 33. This seal 424 also helps reduce or prevent the passage of liquid or brewing substance around the insert. Rather, the brewed beverage must flow through the filter material 428 carried on the insert 35. Generally, the filter material 428 is supported by a structure 430 attached to the blade 39. The filter material 428 prevents the passage of undesirable particles of the brewing substance into the brewed beverage which is dispensed from the nozzle 74.

Figure 9:
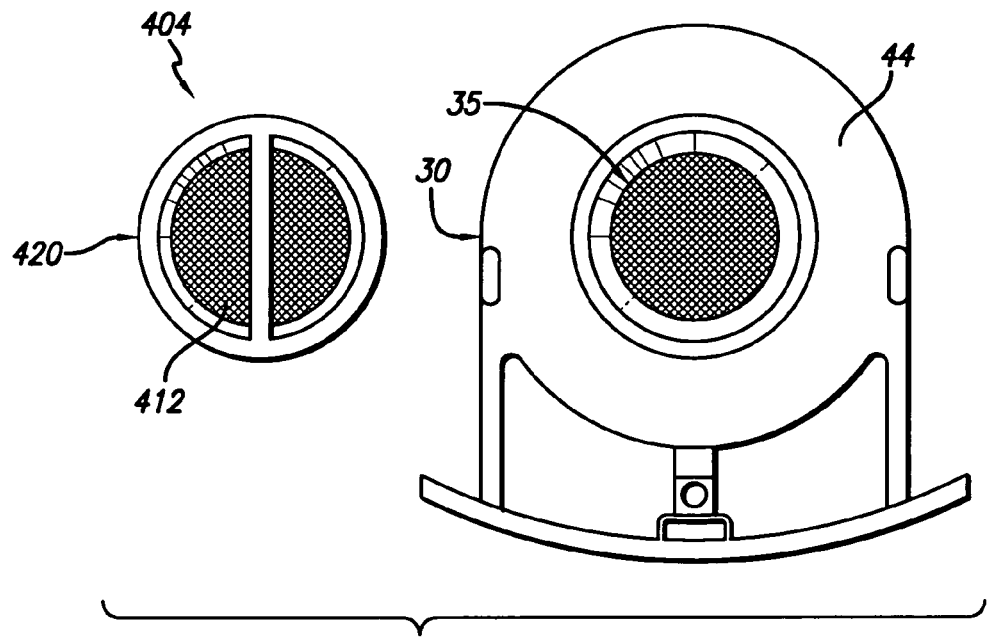
FIG. 9 is a top perspective view showing the cover removed from the holder.
Figure 10:
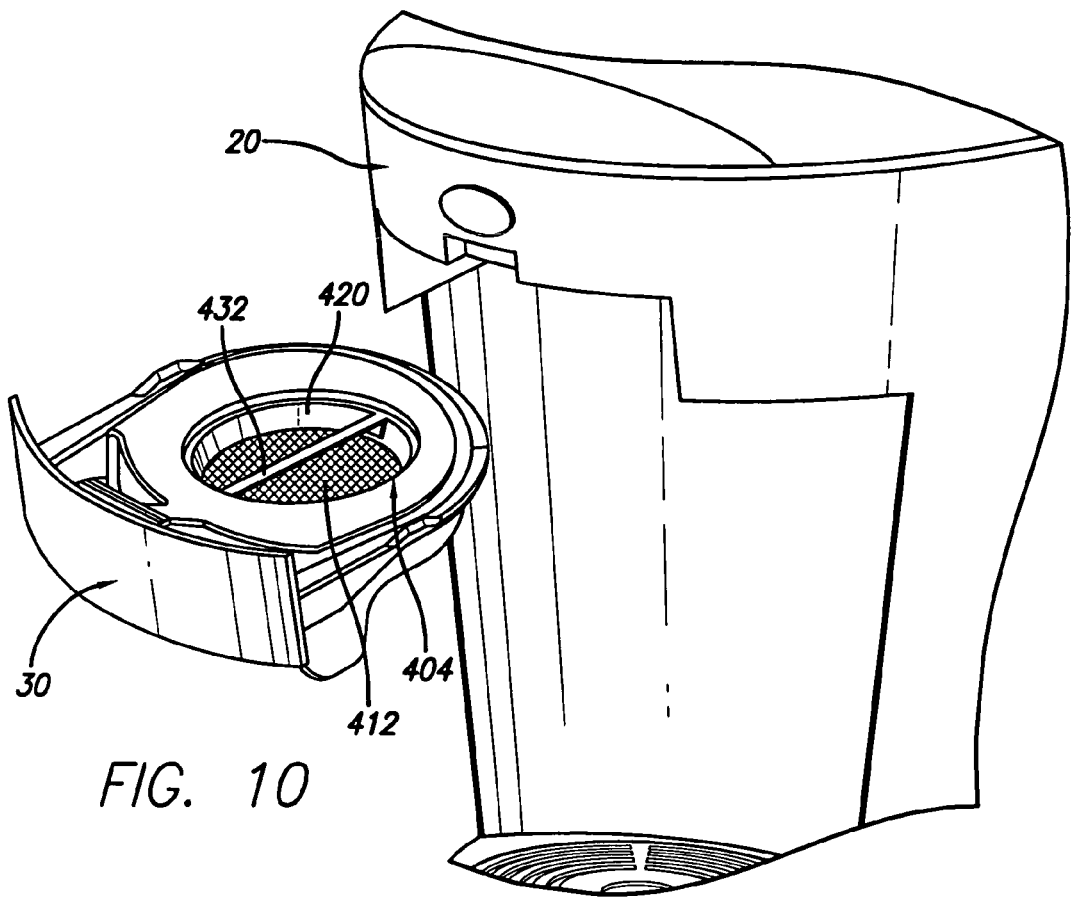
FIG. 10 is an enlarged partial fragmentary perspective view showing positioning of the holder in relation to a brewer such as that shown in FIG. 1.
Figure 12:
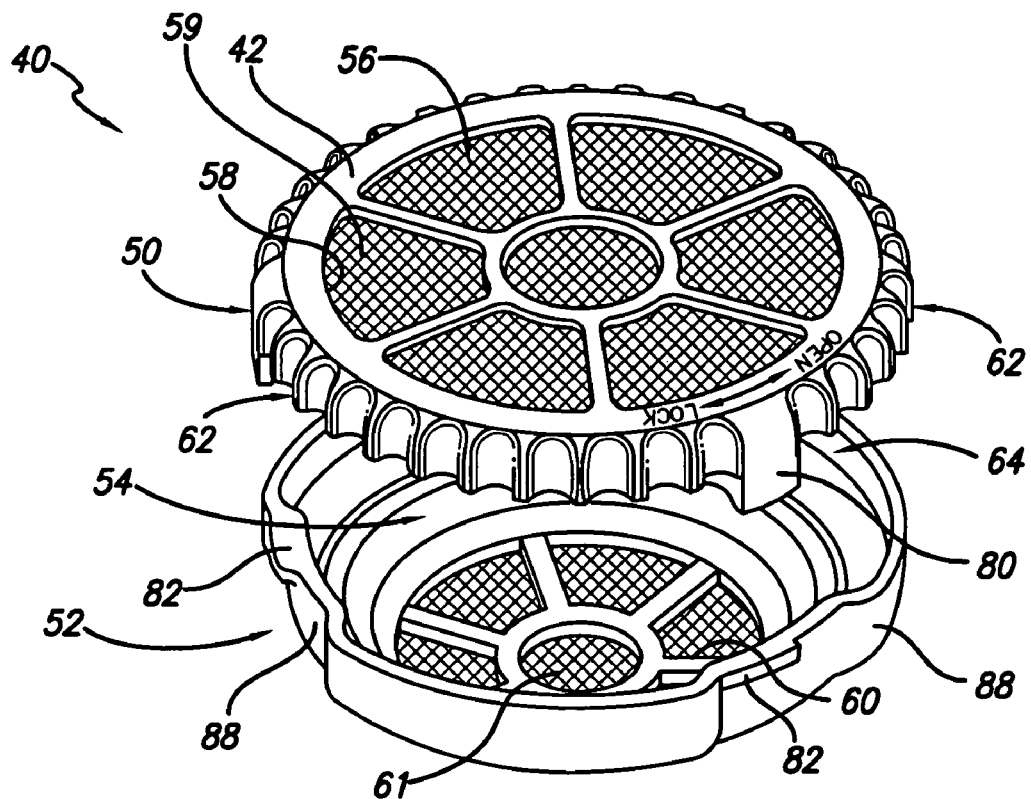
FIG. 12 is an enlarged, exploded perspective view of the pod assembly shown in FIG. 11.

As shown in FIGS. 8, 9 and 10, the cover 404 includes a handle 432 attached to the rim 420. The handle 432 is generally of a low profile design thereby allowing for a gripping structure, yet not intruding or interfering with the operation of the holder 30 when inserted into the brewer 20. Various forms of the handle may be provided such as one which is integrally formed with the rim 420. Additionally, the handle 432 provides additional structure to reinforce the overall structure of the cover 404.

The insert 35 may include, by way of example but not limitation, the mesh and structure as shown herein or may be formed of the mesh and structure as shown in U.S. Pat. No. 5,292,437, issued to the assignee of the present invention. The disclosure in teachings of U.S. Pat. No. 5,292,437 is incorporated herein by reference in its entirety.

In use, the reusable container structures including the cover 404 and the insert 35 can be provided with a brewer as shown in FIG. 1. While the structures 404, 35 can be the primary devices which are used in the brewing process, they can be provided as an accessory as well. In this regard, the brewer can be provided for use with prepackaged pods. Such pods may be supported by the insert 35 as shown herein or as shown in the related U.S. Provisional Application No. 60/575,235. All of the variations of the infusion container disclosed herein are to be broadly interpreted. Additionally, all of the variations of the infusion container may be used as a retrofit or accessory kit with a brewer. The reusable container structures 404, 35 allow a user increased choices in preparing coffee by allowing the user to install the insert 35, place a desired quantity of brewing substance 408 into the cavity and then placing the cover 404 there over. The user can use a relatively large or small charge of coffee and can control the type of grind and coffee used in the brewer. Additionally, there may be economic benefits to using loose coffee instead of prepackaged single serving pods. The cover 404 can be provided in a hinged configuration such that the hinge is attached to the holder 30 and the cover 404. This would allow the hinged structure to be retained on the holder 30. The hinged structure may be configured such that it pivots out of the way for use with pods and pivots into place for use with loose coffee.

Figure 11:
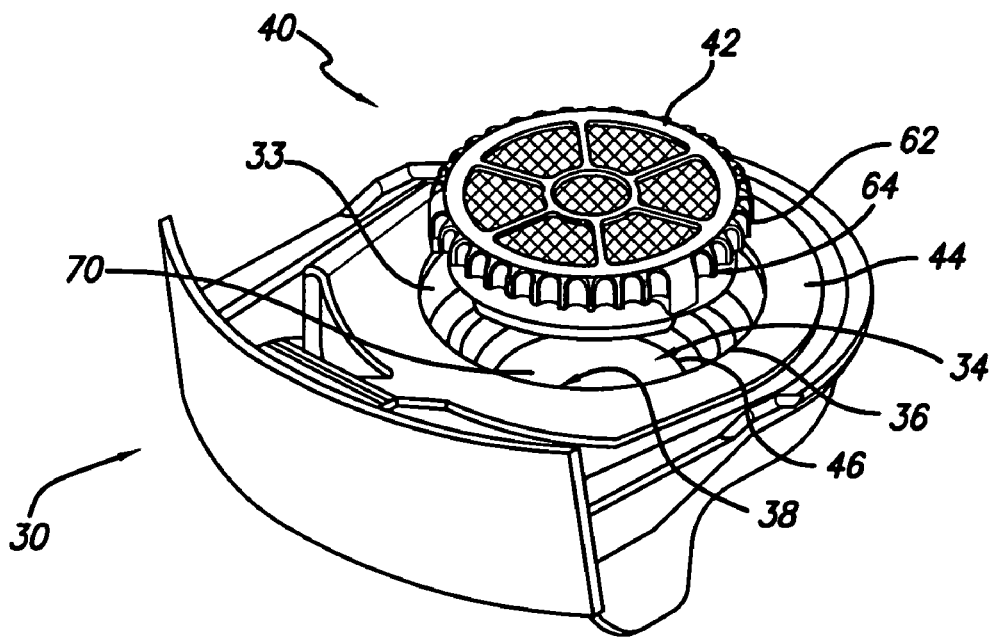
FIG. 11 is an enlarged exploded perspective view of a brewing substance holder of the brewer removed from the brewer with an infusion container or pod assembly positioned for placement in the holder.
Figure 13:
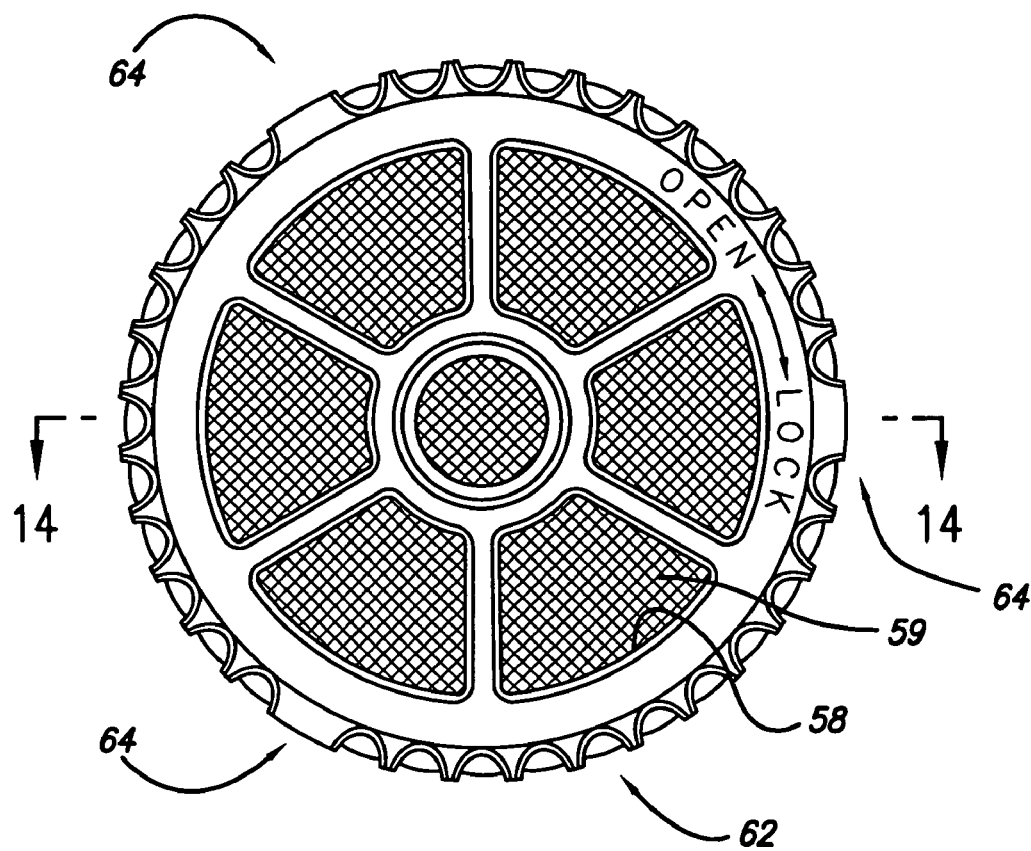
FIG. 13 is a top plan view of the pod assembly as shown in FIG. 12.

As further shown in FIG. 11, a pod assembly or infusion container 40 is shown. The pod assembly 40 as shown in FIG. 11 is elevated from or exploded from the cavity 34 of the holder 30. This positioning of the pod assembly 40 relative to the holder 30 is provided for clarity. In use, the pod assembly is positioned in the cavity generally with a top surface 42 of the pod assembly 40 positioned relative to and generally flush with a corresponding top surface 44 of the holder 30. As described herein and the other corresponding applications incorporated herein by reference, a water system delivers water to the holder 30 such that water is infused through the top portion 42 of the pod assembly 40 to infuse beverage brewing substance retained within the pod assembly 40. The brewed beverage passes through the brewing substance retained in the pod assembly and is dispensed through a dispensing hole 46 generally in the bottom of the cavity 34 of the holder 30.

With further reference to FIGS. 12-16, the pod assembly or infusion container generally includes a first portion 50 and second portion 52. The first portion 50 and second portion 52 define a cavity 54 there between. Brewing substance is retained in the cavity for brewing within the holder 30. A first face 56 of the first portion 50 is provided with at least one opening 58. The openings 58 are covered with a foraminous or otherwise water permeable material 59. While the term mesh is used herein for convenience, the term is intended to be broadly interpreted to include any type of material, substance, or structure which retains the brewing substance but allows water and brewed beverage to pass therethrough. For example, a woven mesh or non-woven fabric made of plastic, metal or any other suitable material may be used. The mesh material may be of any suitable construction having an openness or porosity, compatible with the type of brewing substance used. Generally, the first portion 50 is formed with the mesh 59 retained therein either by attaching the mesh 59 portion in segments, sheets or otherwise over molding or attaching the mesh 59 to the first portion 50. While the term mesh is used, it is contemplated that any other suitable foraminous, water permeable or otherwise open material may be used to allow water to pass from the upper surface 42 of the first portion 50 into the cavity 54. Additionally, the present disclosure is intended to include all variations of infusion containers that have at least two pieces including a first portion and a second portion and in which the first portion and second portion define a cavity therebetween for holding a brewing substance therein. The first and second portions may or may not be engageable. The infusion containers which are engageable are intended to include all forms of engaging the two portions.

Likewise, the second portion 52 includes corresponding openings 60 which are covered by a suitable mesh material 61. The mesh 61 in the second portion 52 may be attached by any suitable method including attaching portions in each opening 60, sheets, over molding or any other way in which the mesh 61 might be attached to the second portion 52. The mesh 61 in the second portion 52 may be the same as the first portion 50 or may be any suitably different opening dimension or mesh dimension to achieve a desirable result. In this regard, it may be desirable to provide a more open mesh in the upper portion to allow water to flood into the cavity for brewing and provide a tighter or smaller mesh in the second portion 52 to trap particles and other materials which might not be desirable for dispensing into a cup 28.

In use, a user will disengage the first portion 50 from the second portion 52 to separate the portions 50, 52 to provide access to the cavity 54. The user then places a desired quantity of brewing substance, such as coffee, within the cavity of the second portion 52 in preparation for infusing the substance with water to produce a brewed beverage. The user then places the first portion 50 over the second portion 52 and engages the two portions to hold the two portions 50, 52 in engagement and to prevent spilling of the brewing substance retained therein. The user then places the assembled pod assembly 40 into the cavity 34 of the holder 30 for brewing. The holder 30 is placed into the brewer for brewing a beverage. At the completion of a beverage brewing cycle, the user removes the pod assembly 40 from the holder 30 and disengages the first portion 50 from the second portion 52. The moist brewing substance in the cavity 54 can then be dislodged from the corresponding first and second portions 50, 52 for disposal. The interior surfaces of the first portion 50 and second portion 52 facility easy rinsing and cleaning. It may be desirable to fabricate the assembly 40 of suitable materials to facilitate and be durable for repeated cleaning such as by use of a dishwashing machine or manual washing.

With further reference to the figures, the assembly 40 includes a grip portion 62 and locking portion 64. The grip portion is shown on the first portion 50 in the form of protrusions. Any other form of gripping structure, such as suitably grippable material, such as an elastomeric material, knurled surfaces, or irregular shapes as well as any other form of gripping structure or material may be used for the grip 62. As shown and described in the present disclosure, the grip portion 62 is provided around the circumferential area of the first portion 50. This allows a user to hold the lower portion and hold the second portion 52 and grip the first portion 50 to disengage the locking structure 64. It is intended that the grip portion be broadly interpreted to extend over all or part of the first portion 50 as well as include such structures or materials on the section portion 52, in addition to or in place of the grip portion on the first portion 50.

The second portion 52 may also include a holding or traction portion 68. The holding or traction portion 68 as shown in the illustrations as protruding ribs. As will described in greater detail below, these ribs 68 also elevate the lower portion 52 off of the base or floor 70 of the holder 30 cavity 34 to allow brewed beverages to flow through the mesh 61 in the second portion 52. When disengaging the first portion 50 from the second portion 52, the user grips the gripping portion 62 and holds the second portion 52. The extending ribs 68 provide traction for resistance to prevent slipping of the second portion relative to the user's hand. The traction portion 68 may also take a variety of embodiments such as other shapes, structures or materials. It is envisioned that any form of traction structure may be used so as to help facilitate disengagement of the first and second portions. It should also be noted that actual structures may not be needed due to the shapes and portions of the pod assembly 40. In other words, the shape and structure of the second portion 52 may be such that it provides suitable traction to resist rotation when disengaging the first portion 50 from the second portion 52.

Figure 14:
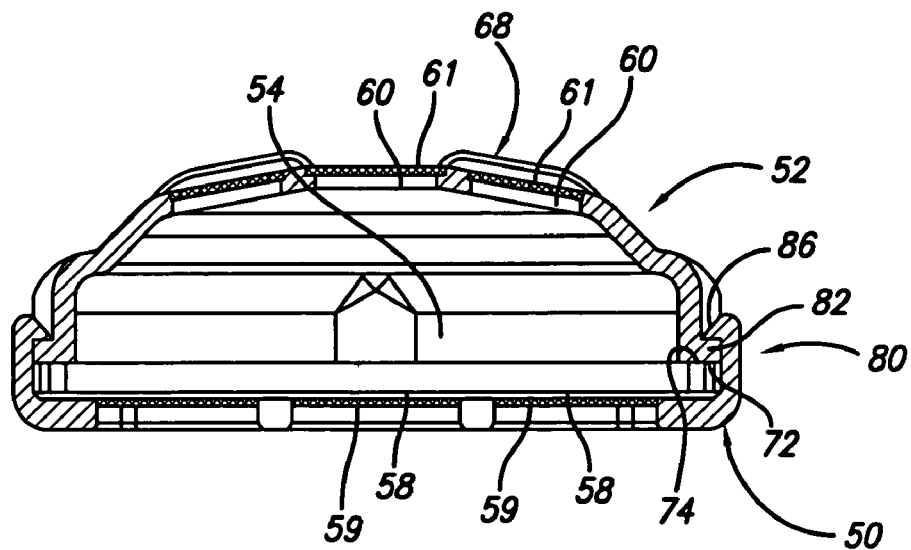
FIG. 14 is an enlarged cross-sectional view of the portion of the pod assembly taken along line 14-14 in FIG. 13.
Figure 15:
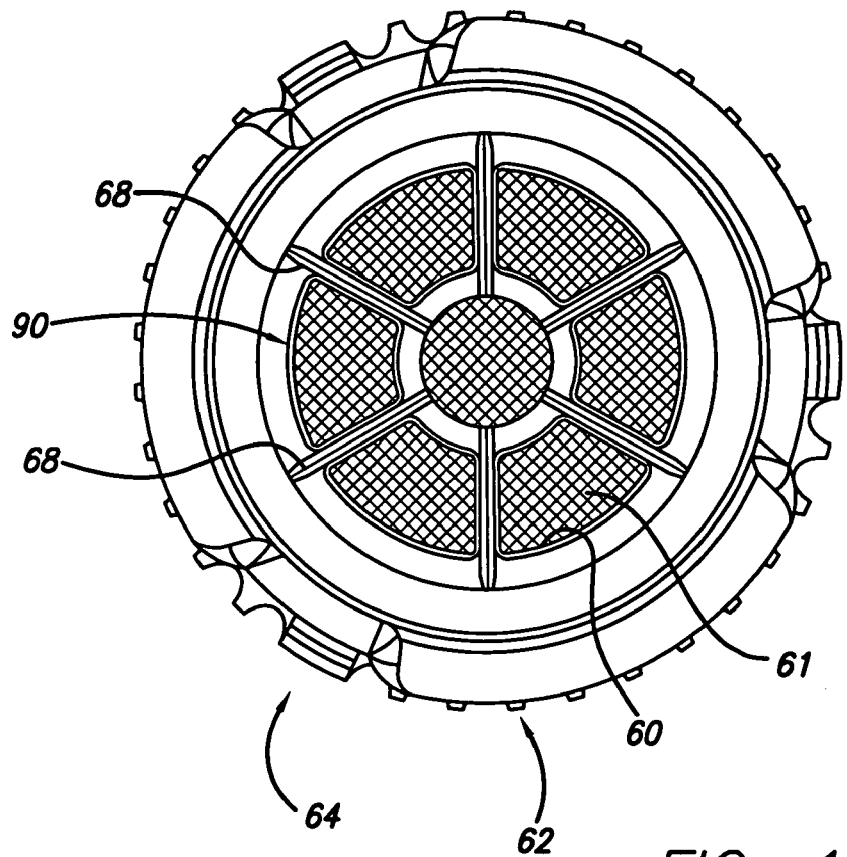
FIG. 15 is a bottom plan view of the pod assembly as shown in FIG. 12.
Figure 16:
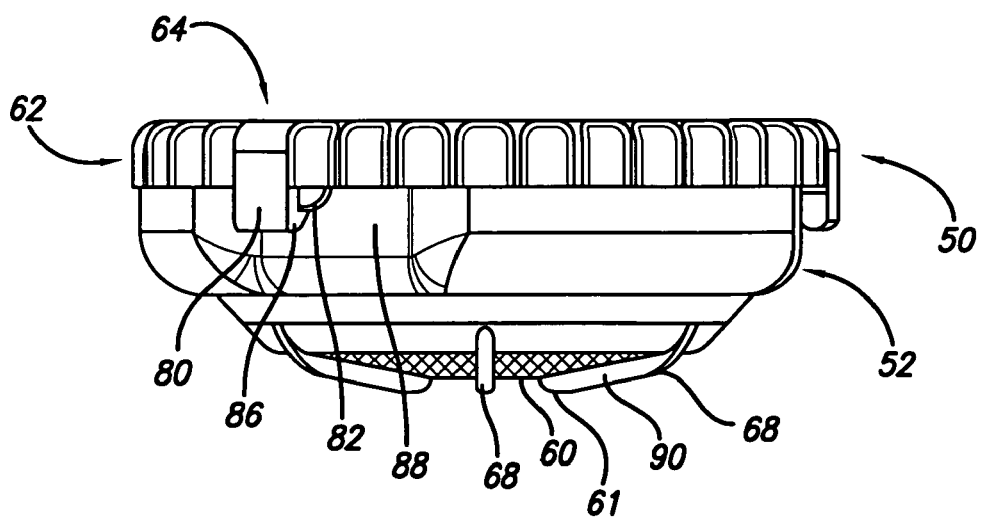
FIG. 16 is a side view of the pod assembly.

With reference to FIG. 14, it can be seen that the second portion 52 has an outer perimeter generally defined by a rim 72. The first portion 50 has a corresponding generally planar surface 74, relative to the rim 72. In this regard, the user can fill the second portion 52 with a suitable brewing substance and then strike or level the brewing substance in the second portion 52 relative to and across the rim 72. The view in FIG. 14 is inverted for consistency with the section line 14-14 in FIG. 13. Alternatively, the user may leave a slightly rounded surface relative to the rim 72. In this regard, the slight overfill or "rounding" of the brewing substance in the second portion 52 may increase the quantity of brewing substance in the pod assembly 40. In this situation, when the user applies the first portion 50, the brewing substance retained in the cavity 54 may be slightly compressed by engagement of the first portion 50 and the second portion 52. This may be desirable, depending on the user's preference. Overfilling and compressing the brewing substance may result in producing a different flavor characteristic or other characteristic of the coffee as might be desired by a particular user. Regardless of the specific details of the resulting beverage, the user will be able to exercise some degree of control in designing and repeating their desired beverage characteristics depending on how they fill the pod assembly.

As shown in the figures, the locking structure 64 includes an extending finger 80 and a corresponding engageable lug 82. The lugs and fingers may be carried on either structure 50, 52 for suitable engagement. The finger 80 shown on the first portion 50 includes an extending barb 86 which engages the corresponding lug 82. Generally, it is preferable to position the locking structures 64 outside of the cavity 54 to minimize the amount of brewing substance which might otherwise interfere with the operation of the locking structure.

As shown, three spaced apart locking structures 64 are spaced around the perimeter of the first and second portions 50, 52. While more or fewer locking structures may be provided, the illustration shows the three locking structures 64. These spaced apart structures provide some degree of balance when engaging the first and second portions 50, 52.

In use, when engaging the first portion 50 on the second portion 52, the user aligns the fingers with a corresponding recess 88 proximate to and in front of the corresponding lug 82. Once the finger 80 is positioned in the recess 88, the user positions the first and second portions 80, 82 together to close the cavity 54. In the closed position, the user can then rotate the first portion 50 relative to the second portion 52 to engage the barbs 86 underneath the corresponding lugs 82 and bring the fingers 80 and lugs 82 into engagement to retain the portions 50, 52 in engagement.

As an alternative embodiment, the first and second portions 50, 52 may be provided with a living or mechanical or otherwise assembled hinge and a corresponding locking structure. While the locking structure as described above with the rotational engagement of the finger and lug may not be applicable in this situation, it is envisioned that a similar snap feature may be used as an equivalent locking structure. For example, the finger and barb may be formed of a suitably flexible material or sliding engagement to allow displacement of the finger when engaging the barb with the corresponding lug. Additionally, this embodiment of the spring biased or snap finger and lug construction may be used in structures which do not have a hinge component. However, it is envisioned that there will be some form of locating structure to facilitate locating an engagement of the first portion and second portion to align the first and second portions prior to engaging the locking structure.

In use, the user separates the first portion and second portion 50, 52 to place brewing substance in the cavity 54. If necessary, the user may then strike or compress the brewing substance in the cavity 54. The user then brings the first portion into alignment with the second portion 52 prior to engagement. The user then engages the lock structures 64 to retain the first and second portions 50, 52 in engagement.

The assembled pod assembly 40 is placed into the cavity 34 of the holder 30. The holder 30 is placed into the brewer and the brew cycle is activated by the user. Heated water enters the brewing area and flows through the mesh 59 covering the openings 58 on the first portion 50. Water flows through the mesh 59 and into the brewing substance whereupon it infuses the brewing substance for extracting a brewed beverage. Brewed beverage flows through the brewing substance and out through the mesh 61 covering the openings 60 in the second portion 52. As the lower portion or base includes the ribs 68, coffee or beverage flowing through the mesh 61 flow through the void 90, defined between neighboring ribs 68, the corresponding surface of the second portion and the floor or bottom 70 of the cavity 34 to and through the hole 46 into the cup 28.

At the conclusion of the brewing cycle, the pod assembly 40 can be removed from the holder 30 and opened to remove the spent brewing substance. The grips 62 on the assembly 40 facilitate removal from the holder 30 even if the brewing substance is relatively warm. This allows a user who wants to repeatably brew beverage from the brewer to do so without being sensitive to warm brewing substance.

The first portion 50 is disengaged from the second portion 52 by rotating the first portion relative to the second portion. As described above, other configurations for engaging and disengaging the pod assembly can be developed based on the teachings of the present disclosure. These various embodiments are included within the scope of the disclosure. The user can then empty the spent brewing substance and rinse the interior surfaces of the cavity 54 for reloading with brewing substance. Additionally, the first and second portions 50, 52 may be fabricated of a dishwasher safe material to allow them to be placed in the dishwasher for cleaning and sanitizing for subsequent use.

It is envisioned that the mesh 59 in the first portion 50 and mesh 61 in the second portion 52 may be sized and dimensioned of a suitable material for use with a desired brewing substance. In this regard, as described above, the mesh materials 59, 61 in the first and second portions 50, 52 may be the same or may be formed of different materials or different sizes. In this regard, a more open or larger mesh size may be used in the upper portion 50 and smaller or tighter mesh portion may be used in the lower portion. Additionally, it is envisioned that mesh may not be used but a foraminous surface, non-woven fabric or any other suitable structure that generally retains larger particle, such as brewing substance and allows liquids such as water and brewed coffee to pass there through.

It is also envisioned that other configurations of mesh may be used in the first and second portions for use with other brewing substances such as herbs, teas or any other substance that might be used. In other words, the mesh portions can be configured to provide a matched flow of water into and beverage out of the cavity depending on the brewing substance used. For example, if it is desirable to allow a large quantity of water to rush into the cavity 54, depending on the brewing substance and restrict the outflow, the inlet mesh can be relatively larger or more porous, while the outlet mesh can be relatively smaller or less porous. Also, by way of example but not limitation, a larger mesh may be used on both ends to produce a lighter beverage, such that the contact time of the water and brewing substance is reduced allowing less contact and lighter beverage production. It is also envisioned that the openings 58, 60 which are covered by the mesh may be devised or otherwise shaped in a variety of configurations and geometries to produce various effect on the brewing process and achieve various results. The various configurations and geometries are within the scope of the present disclosure and incorporated herein.

Figure 17:
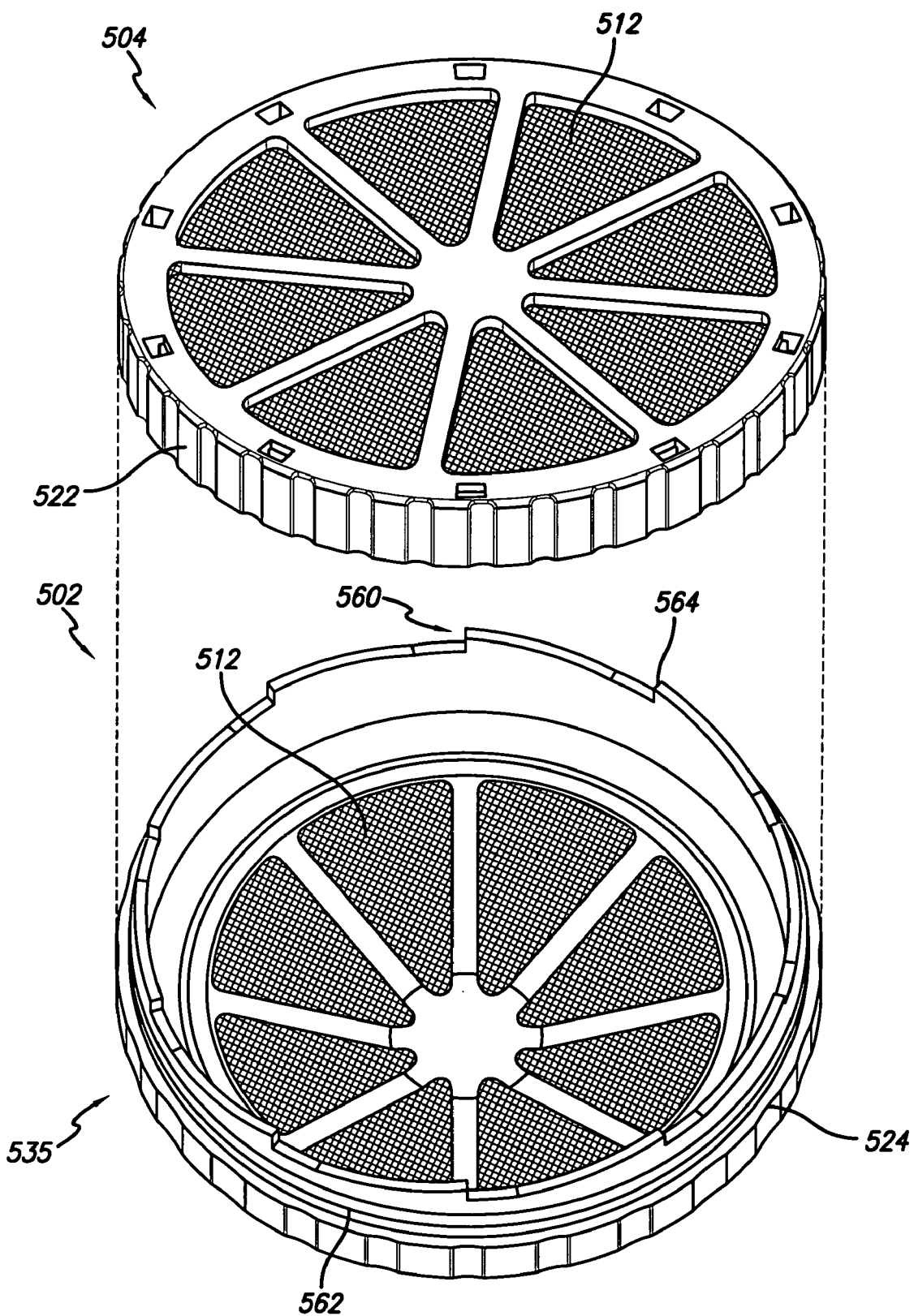
FIG. 17 is a perspective view of another embodiment of an infusion container for use with a holder as shown, showing a cover removed from a base portion.
Figure 18:
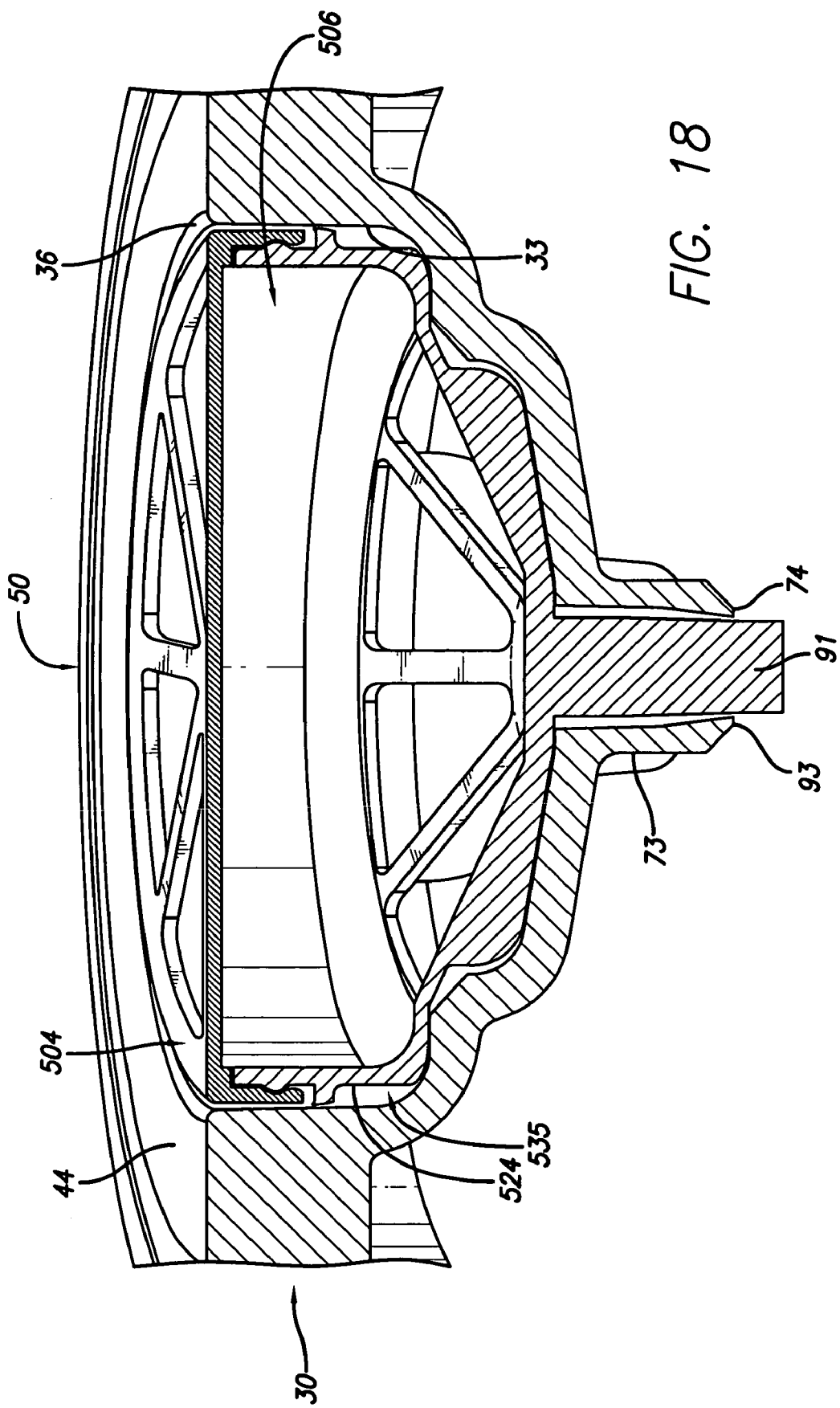
FIG. 18 is an enlarged, partial fragmentary, cross sectional view of the infusion container of FIG. 17 positioned in a holder.

FIGS. 17 and 18 show another embodiment of a reusable infusion container 502. This embodiment of the reusable infusion container includes a two part construction, including a cover 504 and a base 535. The base may include a flange or seal 524 for engaging the inside surface 426 of the wall 33. Similarly, a seal or flange 522 may be provided on the cover 504 to engage the rim 36 of the wall 33. The cover and base 504, 535 define a cavity 506 therein for retaining brewing substance. Brewing substance is placed in the cavity 506 and the cover 504 is placed there over. The cavity 506 can be partially filled or filled to the rim, such that positioning of the cover 504 there over strikes or levels the brewing substance retained in the cavity 506. The user can determine the degree of compaction of brewing substance in the cavity 506. Mesh material 512 is provided on the cover 504. A similar mesh structure or material such as is used on the insert 35 as shown in FIG. 8 is provided in the base 535. Mesh or permeable material is not shown in FIG. 18 in the interest of clarity.

As also shown in FIG. 17, the structure of the base or cover 535, 504 can be configured with a ratcheting or other engaging structure shown generally herein as reference number 560. The threads allow the cover 504 to be engaged with a portion of the base 535 in a positive manner. The ratchet points on the base 535 engage corresponding ratchet points on the cover 504. The threads and ratchet points provide positive engagement as well as a sensory feedback to indicate the degree of engagement or compaction of the brewing substance retained between the cover 504 and base 535. For example, the base 535 can be filled with a brewing substance which, generally is placed in a loose, uncompacted state. Placement of the cover 504 over the base facilitates engagement of the cooperative threads on the corresponding portions of the cover and base. Rotation of the cover relative to the base further engages the threads whereupon the ratchet structures 564 are encountered. By way of example but not limitation, first engagement or clicking of a first ratchet structure indicates compaction level 1. Further rotation and clicking or engagement of the ratchet structures indicates further compaction. As such, a user can repeatably control dose by using a measuring spoon to place a desired quantity of brewing substance within the base 535. The user can also repeatedly control the degree of compaction of the brewing substance by use of the engaging structures 560. As such, these features of the container 502 adds greater control in the use of the reusable container 502.

The reusable container 502 as shown in FIGS. 17 and 18 operates in a similar principle to that as shown in the previous figures. The container may be provided as an accessory to the brewer 20 or as an additional purchase part or retrofit kit. The container 502 can be sized and dimensioned for use with any variety of brewers which might otherwise use single serving disposable pods. The reusable container allows greater control in the brewing of beverages, possible cost savings as well as positive environmental effects by not placing additional materials which might otherwise be provided in a reusable form.

As shown in FIG. 18, the container 502 is placed in the cavity holder. The holder can then be installed in the brewer for subsequent brewing operations. Once the brewing operation has been completed the drawer 30 is removed from the brewer 20 and the holder 502 can be removed from the holder 30. The cover 504 is separated from the base 535 for rinsing or otherwise removing the spent brewing substance 408. The cover 504 and base 535 may be formed of any suitable material including plastics, metallic materials, glass, composite materials, suitable flexible materials such as sanitation-approved cooking silicones and other similar materials as well as other materials not here listed. The general concept is to provide a two part reusable container which can be filled with the brewing substance and then placed in the holder 30.

In use, the container 502 is filled with a brewing substance to a desired level and compaction. The container 502 is placed in the holder 30 whereupon the holder is engaged with the brewer 20. During a brewing cycle, brew water flows through the upper mesh or other foraminous structure 512 and through the brewing substance retained in the container 502. Brewed beverage flows outwardly from an open or otherwise foraminous area of the base 535 and through the holder 30 for subsequent dispensing into a container such as a cup 28. After use, the container 502 is removed from the holder 30 for subsequent removable of spent brewing substance and, if desirable, cleaning of the holder parts 504, 535.

Figure 19:
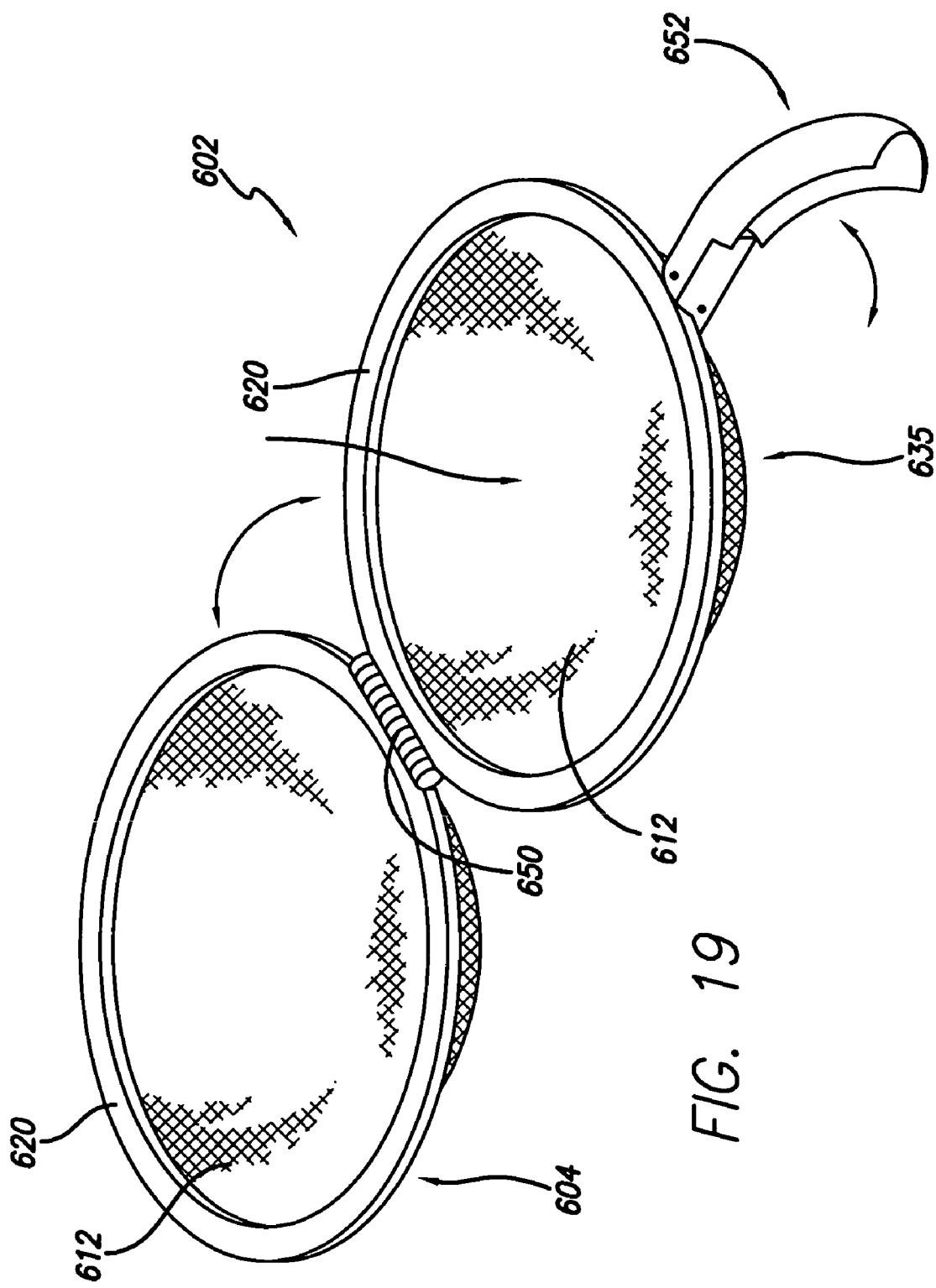
FIG. 19 is a perspective view of another embodiment of an infusion container including a hinged cover displaced from a corresponding base and including a locking or securing device.

A further embodiment of a reusable infusion container 602 is shown in FIG. 19. FIG. 19 shows the reusable container 602, having a base 635 and a cover 604. In this embodiment, the cover 604 is attached to the base 635 by a hinge 650. Additionally, a closure or clasp structure 652 is retained on either the cover 604 or base 635. A rim portion 620 retains a structure or other foraminous material 612. In the embodiment as shown as FIG. 19, the mesh material is formed in a generally arcuate or partially spherical shape so as to help define a cavity between the base 635 and the cover 604. While the cover need not be provided with a similar arcuate structure, it should include at least a partially foraminous or otherwise mesh area 612. Generally, a rim 620 is provided on the cover 604 to retain the foraminous material 612 there between. A seal may be provided under the rim 620 of the base 635 so as to engage the internal surfaces of the cavity of the holder 30.

In use, the reusable container or infusion container 602 is opened by disengaging the clasp 652 from the rim portions of the cover 604 and the base 635. The cover 604 can then be removed from the base to allow the placement of brewing substance therein. Once a desired quantity of brewing substance has been placed in the base 635, a cover 604 is placed there over with the clasp 652 positioned to engage the rims 620. The closed and retained container 602 can then be placed in the cavity of the holder 30 as shown in FIG. 2. The holder 30 can then be engaged with the brewer 24 commencing a brewing operation. At the end of a brewing operation, the container 602 can be removed from the holder 30 to allow opening of and cleaning of the container. Spent brewing substance can then be removed from the container and subsequent cleaning or other steps can occur to the container 602. As noted above with regard to the other embodiments, the container 602 can be provided with the brewer 20 as the primary brewing substance holder or as an accessory or retrofit kit for use with this or other brewers. Of course, the container 602 will be sized and dimensioned for an appropriate brewer. It is possible that any of the containers disclosed herein can be sized and dimensioned such that a single reusable container can be used across a variety of single cup brewers which might otherwise use disposable single serving pod products. The infusion container as shown in FIG. 19 can be placed in the cavity of the holder for brewing.

As mentioned hereinabove, the customized pod or infusion container may be configured in one of many suitable configurations adapted to enable substantial containment of a brewing substance while at the same time, allowing brewing substance selection and accommodating varying amounts of the selected brewing substance. Additionally, the customized pod may be constructed using one of many suitable materials such as a reusable synthetic or metallic material or a disposable filter paper material, to name a few.

For example, the customized pod or infusion container may be configured as a refillable infusion container constructed of a metallic material such as gold mesh and sized and dimensioned to be received in the cavity 34 of the holder 30. In one embodiment, the refillable infusion container 200 includes a container portion 202 coupled to a removable spring loaded handle 204. In another embodiment, the container portion 202 is provided without a handle 204. The container portion 202 includes a first container half 206 having a first rim 208 radially disposed around the edge of the first container half 206, and a second container half 210 having a second rim 212 radially disposed around the edge of the second container half 210. The handle 204 is preferably formed by a first outer arm 214 and a second outer arm 216 pivotally mounted to a V-shaped spring loaded actuating arm 218. A first end of the first outer arm 214 is pivotally coupled to a first end of the V-shaped spring loaded actuating arm 218. Similarly, a first end of the second outer arm 216 is pivotally coupled to a second end of the V-shaped spring loaded actuating arm 218. The first outer arm 214 includes a first flange 220 disposed proximate to the second end of the first outer arm 214, and the second outer arm 216 includes a second flange 222 disposed proximate to the second end of the second outer arm 216. A pivot pin 224 inserted through a first aperture in the first flange 220 and a second aperture in the second flange 222 pivotally couples the first outer arm 214 to the second outer arm 216.

The second end of the first outer arm 214 is removably attached to a first rim portion 226 of the first rim 208 via a first bracket 230 mounted to the first rim portion 226. Similarly, the second end of the second outer arm 216 is removably attached to a second rim portion 228 of the second rim 212 via a second bracket 232 mounted to the second rim portion 228. The first rim portion 226 is proximate to the second rim portion 228 when the refillable infusion container 200 is biased into the closed position.

Figure 20:
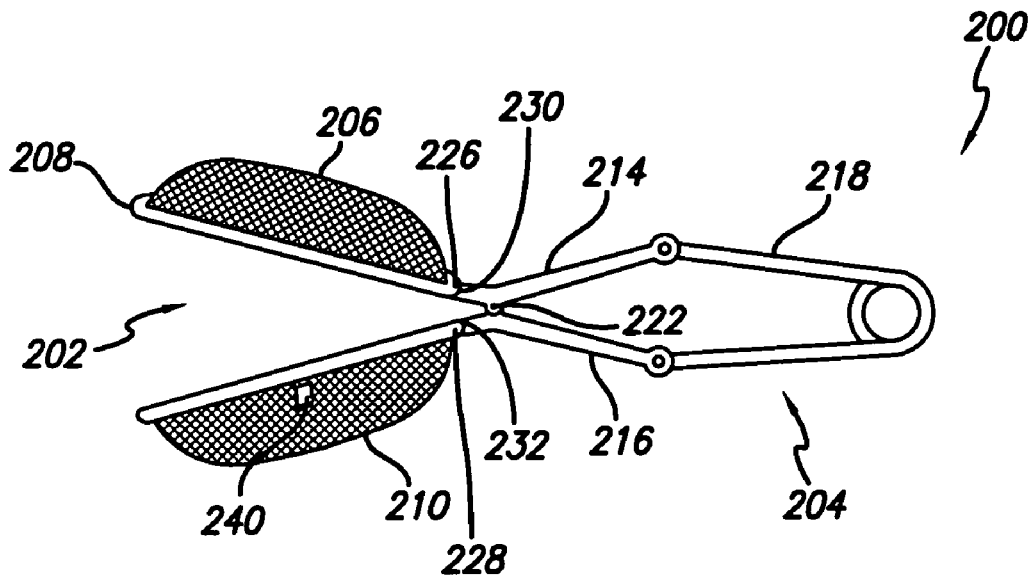
FIGS. 20 and 21 are side views of a reusable pod in the form of an infusion container as set forth in the present disclosure.
Figure 21:
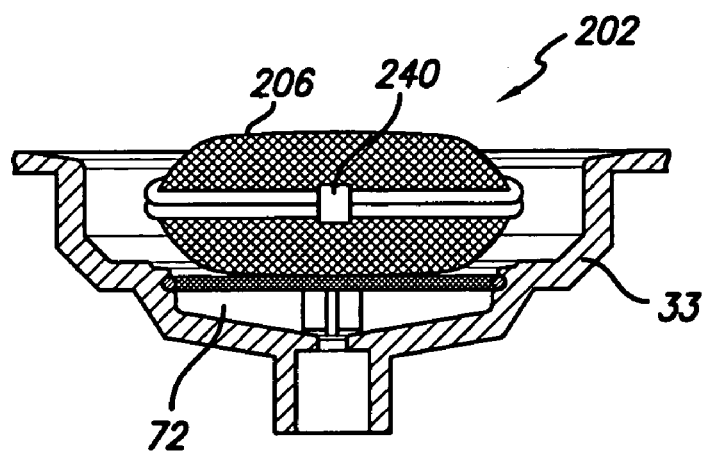

Upon compression of the V-shaped spring loaded actuating arm 218, near the area of the first ends of the first and second outer arms 214, 216, the first and second container halves 206, 210 are urged apart. The first rim portion 226 is no longer proximate to the second rim portion 228. Any suitable brewing substance, in any suitable quantity may then be deposited within the container portion 202 (see, FIG. 19). Upon closing the first and second container halves 206, 210, the container portion 202 may be latched via a first latch 240 and a second latch 242 (not shown), and the spring loaded handle 204 removed. The infusion container in the form of the latched container portion 202 may then be placed in the cavity 34 (see, FIG. 20). Although removable, it is contemplated that the spring loaded handle 204 may be non-removable and may include a non-heat conductive material (e.g., high temperature plastic, suitable metal, or ceramic material) adapted for grasping during removal of the refillable infusion container 200 from the single-serving brewer 20. The embodiment using the non-removable handle included sufficient gasketing and sealing around the handle to maintain the desired closure of the brewing chamber during the brewing process.

The refillable infusion container 200 may be constructed of any suitable metallic material including, but not limited to gold mesh, enabling suitable brewing liquid flow there through and suitable durability for repeated use and reuse. In addition, although preferably puck-shaped, the refillable infusion container 200 may be configured in one of any number of suitable shapes sized to fit within the cavity 34, including, but not limited to, a dome shape, a spherical shape, an elliptical shape, a basket shape or a conical shape, to name a few. Further, although the removable spring loaded handle 204 enables access to the interior of the container portion 202, other methods to access the interior of the container portion 202 are contemplated. For example, the first and second container halves 204, 206 may be threadedly coupled or hingedly coupled in a clam shell fashion, thereby precluding the need for access via operation of the spring loaded handle 204.

Figure 22:
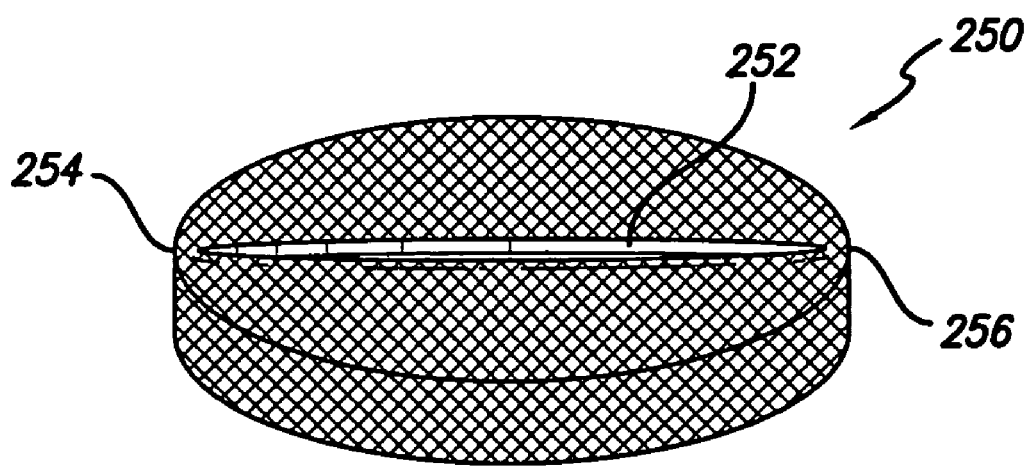
FIGS. 22 and 23 are perspective views of another infusion container in the form of a reusable purse-shaped container as set forth in the present disclosure.
Figure 23:
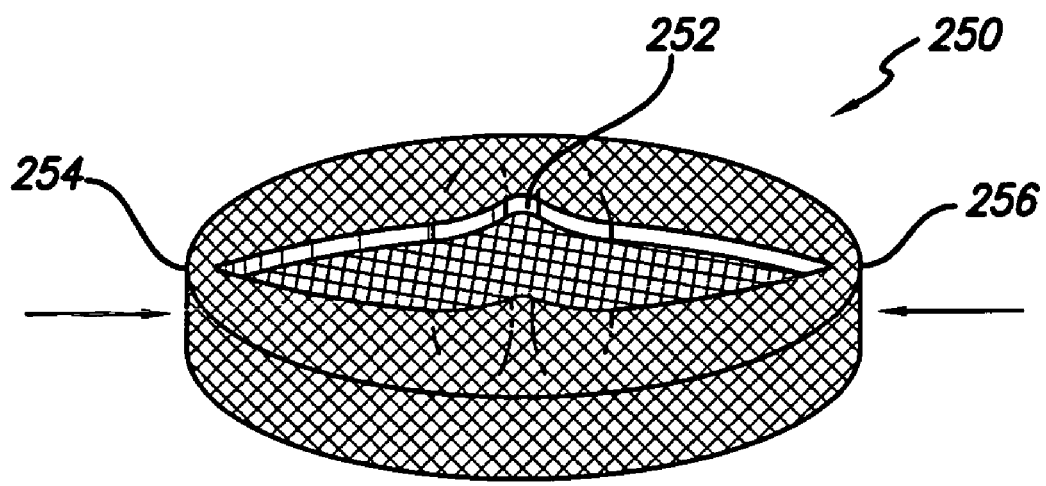

The infusion container may also be configured as a reusable container 250, utilizing a resilient metallic porous material or a spring loaded metallic porous material. As illustrated by FIGS. 22 and 23, the reusable container 250 may be configured as a resilient "purse-shaped" reusable pod of a suitable shape and sized and dimensioned for use with a corresponding brewer. The purse-shaped pod has a slit 252 therein (rather than being formed by first and second container halves 206, 210). As illustrated, the interior of the purse-shaped reusable pod 252 can then be accessed by "pinching" opposing sides 254 and 256 of the resilient purse-shaped device 252 (see, FIGS. 22 and 23).

Figure 24:
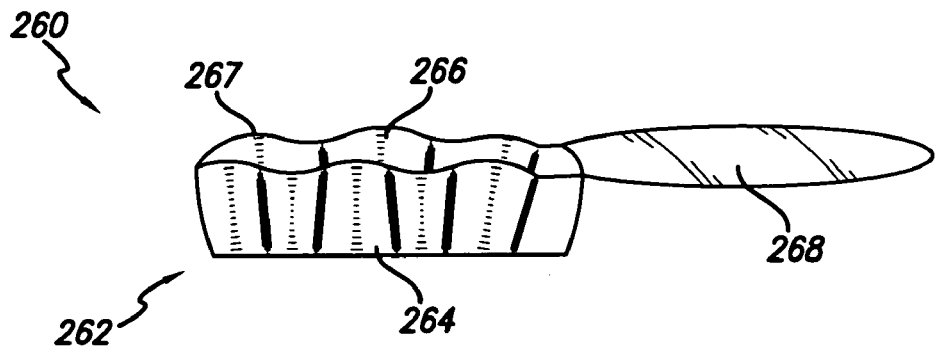
FIG. 24 is a perspective view of a disposable infusion container having a cup-cake filter shape and a cover as set forth in the present disclosure.

As mentioned above herein, the customized pod or infusion container may also be constructed using other types of porous materials such as a disposable filter paper material or other suitable disposable porous material. For example, FIG. 24 is a perspective view of a disposable customized pod 260 constructed of a disposable filter paper material and configured in a "cup-cake" filter shape. In the illustrated example, the disposable pod 260 includes a cup portion 262 having a wall 264 which defines a brewing substance holding area 266 for holding the brewing substance, which is generally similar to larger versions of this filter configuration as used in larger brewers. However, a flap portion 268 can be added to the filter, coupled to a portion of a rim 267 defined by the wall 264. Upon receiving the brewing substance in the brewing substance holding area 266, the flap portion 268 is folded over the brewing substance holding area 266. The filled, disposable customized pod 260 may then be placed in the cavity 34 for brewing. The disposable customized pod 260, therefore, provides sufficient containment for the brewing substance, while at the same time, allows the user to select the type and amount of brewing substance. Although illustrated as having a flap portion 268, it is contemplated that the pod 260 may be configured without the flap portion 268. Further, it is also contemplated that the disposable customized pod 260 may be configured in one of any number of suitable shapes such as a cone shape, a trough shape, a pouch shape with or without a twist-top portion, etc.

The disposable customized pod may also be configured with a removable portion that is discarded after filling to reduce the amount of disposable filter paper material exposed to the brewing liquid during the brewing process. Accordingly, after the brewing substance is placed in the brewing substance holding area 266 but before the beverage is brewed, the removable portion that is to be discarded is removed.

Figure 25:
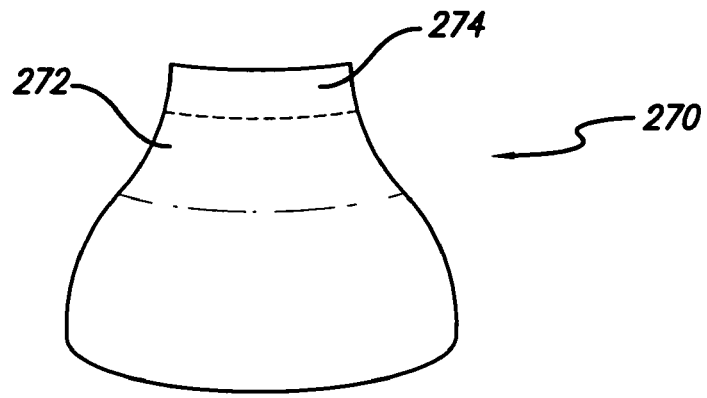
FIGS. 25 and 26 are side views of a disposable infusion container having a twist-top pouch shape as set forth in the present disclosure.
Figure 26:
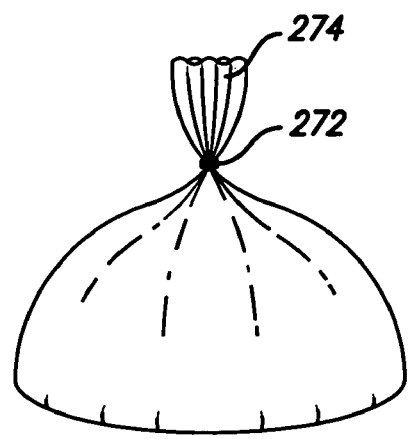

For example, the disposable customized pod may be configured as a pouch with a twist-top having a removable portion. Referring to FIGS. 25 and 26, there is shown a disposable customized pod 270 configured as "pouch" with a twist-top 272 having a removable portion 274. After filling with a brewing substance, the brewing substance holding area 266 can be manually twisted shut to contain the brewing substance via the twist-top 272, and the removable segment 274 removed and discarded. The filled and closed customized pod 270 can then be placed into the cavity 34 for brewing. Although manually removed by the user, it is contemplated that the removable portion 274 may be automatically removed by a suitable device of the single-serving brewer 20.

Figure 27:
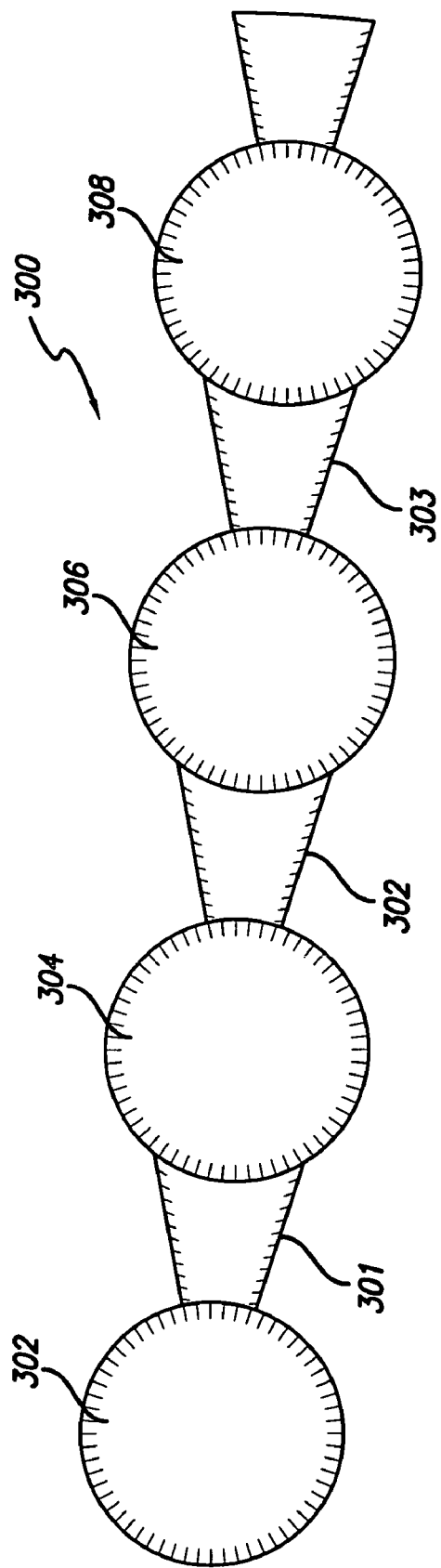
FIG. 27 is a side view of a tape of detachable disposable infusion containers as set forth in the present disclosure.

The disposable customized pod also may be configured as one of a string of detachable disposable customized pods that are adapted to be used in a customized pod making system. It is contemplated that the customized pod making system may be included in the single serving brewer 20 or it may be a stand-alone system. For example, FIG. 27 is an exemplary string of detachable disposable customized pods 300 that may be utilized in conjunction with the single serving brewer of FIG. 1.

In the illustrated example, the string of detachable disposable customized pods 300 includes four detachable disposable customized pods 302, 304, 306 and 308, however, more or less customized pods may be included. Although the detachable disposable customized pods are illustrated as having a circular "pouch" shape, other shapes, including, but not limited to, a cone shape, a puck shape, a square shape and a basket shape, are contemplated. In one embodiment, the detachable disposable customized pods 302, 304, 306 and 308 may be detached, filled with a brewing substance and placed into the single serving brewer 20 via a manual process. In another embodiment, the detachable disposable customized pods 302, 304, 306 and 308 may be detached, filled with a brewing substance and placed into the automatically the single serving brewer 20 via an automatic process. In further embodiments, it is contemplated that one or more combinations of manual and automatic steps may be utilized to detach, fill and place the detachable disposable customized pods 302, 304, 306 and 308 into the single serving brewer 20.

Additionally, manual or automatic closing or sealing of the filled detachable disposable customized pods 302, 304, 306 and 308 is contemplated. For example, upon filling the detachable disposable customized pod 302 with a brewing substance, a neck portion 301 of the detachable disposable customized pod 302 may be automatically cut and/or removed, and the remaining aperture sealed via heat, compression, suitable adhesive or by use of mechanical clamps or retainers.

Referring again to FIG. 2, in the installed position, the holder 30 is positioned with the entry opening 38 in position to receive the brewing liquid (e.g., water). The entry opening 38 and cavity 34 are positioned below a spray head 40. Any one of the customized pods described above is held within the cavity 34. During operation, the brewing liquid 46 provided by a water delivery system of the single-serving brewer 20, enters a spray head area 42 defined by the spray head 40. The brewing liquid 46 in the spray head area 42 then flows through holes 44, through the entry opening 38, and into the cavity 34. Upon receipt in the cavity 34, the brewing liquid 46 mixes with the brewing substance retained by the customized pod. The brewing liquid 46, flowing through the customized pod and infusing the brewing substance contained therein, subsequently drains under pressure and gravity through the support structure 73, and into open areas defined by the upstanding ribs 72 where the soluble portions of the brewing substance with the brewing liquid are pooled and mixed. When completed, the brewed beverage drains through a drain hole 50, into the drain 70 for dispensing into the cup 28.

In use, the beverage maker is employed with a refillable or reusable substance container as well as a selectively fillable substance container. The steps involved in this process include providing an infusion container. The infusion container is then filled with a suitable beverage making substance. The infusion container is placed in a corresponding beverage maker and employed during a brewing cycle to produce a desired beverage. At the conclusion of the brewing cycle, the infusion container can be removed and disposed of or cleansed for reuse.

Further details of the configuration and operation of the single-serving brewer 20 can be found in related provisional applications and subsequent non-provisional applications entitled "Apparatus, System and Method for Infusing a Pre-Packaged Pod Ser. No. 60/543,370 filed Feb. 9, 2004, "Apparatus System and Method for Retaining Beverage Brewing Substance" Ser. No. 60/542,433 filed Feb. 6, 2004, and "Pod Brewer Design" 29/199,168 filed Feb. 10, 2004, U.S. Design application No. 29/199,168. Additional information relating to adjustable controlling the single-serving brewer 20 can be found in a related provisional application and subsequently filed non-provisional applications entitled "Adjustable Volume Brewer" filed Nov. 7, 2003, U.S. Provisional Application No. 60/518,039. Additional information related to a spray head system and method for delivering water to the brewing assembly of the single-serving brewer 20 can be found in U.S. Provisional Application and subsequently filed non-provisional application entitled "Water Delivery System, Method and Apparatus" filed Nov. 7, 2003, U.S. Provisional Application No. 60/518,411. Additional information related to beverage making apparatus which uses loose coffee and related devices and methods of use can be found in U.S. Provisional Application and subsequently filed non-provisional application entitled "A Beverage Making Apparatus and Method Using Loose Beverage Substances" filed Apr. 2, 2004, U.S. Provisional Application No. 60/560,033. Information about a pod holder with a removable insert can be found in U.S. Provisional Application and subsequently filed non-provisional application entitled "Pod Holder with Removable Insert" filed May 28, 2004, U.S. Provisional Application No. 60/575,235. Information about a beverage making apparatus which uses loose coffee and related devices and methods of use can be found in U.S. Provisional Application entitled "A Beverage Making Apparatus and Method Using Loose Beverage Substance" filed Sep. 1, 2004, U.S. Provisional Application No. 60/606,233. Each of the above-referenced applications and the materials set forth therein is incorporated herein by reference in its entirety.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure.

The invention claimed is:

1. A brewing substance retaining container for use in a heated water brewer, the container comprising:
   a first hollow portion;
   a second hollow portion;
   a cavity defined between the inside of the first hollow portion and the inside of the second hollow portion when the first and second portions are assembled to hold a brewing substance in the cavity;
   openings in spaced apart faces of the first and second portions;
   water permeable material covering the openings for allowing water to flow from the brewer through the first portion and flow into brewing substance retained in the cavity and to allow beverage to flow out of the second portion;
   locking structure cooperatively positioned on corresponding portions of the first and second portions to permit releasably engagable locking of the first and second portions to retain a quantity of brewing substance in the cavity for use in brewing a beverage; and
   wherein the beverage substance retaining container is retained in a brewing chamber in a heated water brewer for receiving heated water dispensed under pressure through the water permeable material in the first portion for infusing the beverage substance in the container and allowing the beverage to flow out through the water permeable material in the second portion.

2. The container as in claim 1, wherein the water permeable portion is a foraminous material.

3. The container as in claim 2, wherein the foraminous material is a woven material.

4. The container as in claim 2, wherein the foraminous material is a non-woven material.

5. The brewing substance retaining container of claim 1, the locking structure further comprising:
   at least one extending finger on one of the first and second portions;
   at least one lug cooperatively positioned on the other of the first and second portions; and
   the finger and lug being cooperatively engageble for releasably retaining the first and second portions in engagement.

6. The brewing substance retaining container of claim 5, the locking structure further comprising:
   three generally equally spaced apart and cooperatively arranged pairs of fingers and jugs.

7. The brewing substance retaining container of claim 5, the locking structure further comprising at least one recess formed in the second portion, a lug being cooperatively retained on and positioned in the recess for receiving a corresponding finger cooperatively retained on and positioned for engaging the lug in the recess.

8. The brewing substance retaining container of claim 5, the locking structure further comprising:
   at least one extending finger on the first portion;
   at least one lug cooperatively positioned on the second portion;
   the finger and lug being cooperatively engageble for releasably retaining the first portion on the second portion; and
   the cooperative pairs of fingers and lugs being configured to facilitate engagement by rotating the first portion relative to the second portion to engage the finger with the lug.

9. The brewing substance retaining container of claim 5, further comprising a gripping portion on an outside surface of the first portion spaced from the locking structure for gripping the container to facilitate engagement and disengagement of the first portion from the second portion.

10. The brewing substance retaining container of claim 9, further comprising a traction portions carried on the second portion for providing resistance when gripping the container to facilitate engagement and disengagement of the first portion from the second portion.

* * * * *

UNITED STATES PATENT AND TRADEMARK OFFICE
CERTIFICATE OF CORRECTION

| | | |
|---|---|---|
| PATENT NO. | : 7,591,218 B2 | |
| APPLICATION NO. | : 11/101321 | |
| DATED | : September 22, 2009 | |
| INVENTOR(S) | : Bunn et al. | |

It is certified that error appears in the above-identified patent and that said Letters Patent is hereby corrected as shown below:

In Column 18, Claim 6, line 34 should read as follows:

--arranged pairs of fingers and lugs--

Signed and Sealed this
Twenty-sixth Day of July, 2011

David J. Kappos
*Director of the United States Patent and Trademark Office*